(12) United States Patent
Karaki et al.

(10) Patent No.: US 9,973,336 B2
(45) Date of Patent: May 15, 2018

(54) HASH VALUE GENERATING DEVICE

(71) Applicant: CANON KABUSHIKI KAISHA, Tokyo (JP)

(72) Inventors: Seiga Karaki, Yokohama (JP); Shinya Yamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 14/773,272

(22) PCT Filed: Feb. 17, 2014

(86) PCT No.: PCT/JP2014/054246
§ 371 (c)(1),
(2) Date: Sep. 4, 2015

(87) PCT Pub. No.: WO2014/136594
PCT Pub. Date: Sep. 12, 2014

(65) Prior Publication Data
US 2016/0013932 A1    Jan. 14, 2016

(30) Foreign Application Priority Data

Mar. 7, 2013 (JP) ................................ 2013-045574
Jan. 31, 2014 (JP) ................................ 2014-017413

(51) Int. Cl.
*H04L 9/06* (2006.01)
*G09C 1/00* (2006.01)

(52) U.S. Cl.
CPC .............. *H04L 9/0643* (2013.01); *G09C 1/00* (2013.01); *H04L 2209/125* (2013.01)

(58) Field of Classification Search
CPC .... H04L 9/0643; H04L 2209/125; G09C 1/00
See application file for complete search history.

(56) References Cited

U.S. PATENT DOCUMENTS 7,489,779 B2 * 2/2009 Scheuermann ....... G06F 9/3879
380/28
7,490,065 B1 * 2/2009 Ogg ..................... G06Q 20/382
705/50

(Continued)

FOREIGN PATENT DOCUMENTS

CN    101617351 A    12/2009
CN    101872338 A    10/2010

(Continued)

OTHER PUBLICATIONS

Alshaikhli et al., Comparison and Analysis Study of SHA-3 Finalists, Nov. 2012, International Conference on Advanced Computer Science Applications and Technologies, pp. 366-371 (Year: 2012).*

(Continued)

*Primary Examiner* — Kenneth W Chang
(74) *Attorney, Agent, or Firm* — Canon USA, Inc. I.P. Division

(57) ABSTRACT

A hash value generating device for generating a hash value based on the KECCAK algorithm includes a $\theta$ processing unit, a $\rho$ processing unit, a $\pi$ processing unit, a $\chi$ processing unit, and an $\iota$ processing unit for performing processing of five steps $\theta$, $\rho$, $\pi$, $\chi$, and $\iota$ included in round processing of the KECCAK algorithm. The $\pi$ processing unit receives input of data in units of planes and outputs data in units of sheets.

18 Claims, 28 Drawing Sheets

(56) References Cited

U.S. PATENT DOCUMENTS

| | | | | |
|---|---|---|---|---|
| 2002/0191791 | A1* | 12/2002 | Anand | H04L 9/0643 380/255 |
| 2009/0262925 | A1* | 10/2009 | Vijayarangan | H04L 9/0637 380/29 |
| 2011/0040977 | A1* | 2/2011 | Farrugia | H04L 9/0662 713/181 |
| 2011/0138192 | A1* | 6/2011 | Kocher | G06F 21/602 713/189 |
| 2011/0273334 | A1* | 11/2011 | Karr | G01S 13/825 342/378 |
| 2012/0057702 | A1* | 3/2012 | Minematsu | H04L 9/3242 380/255 |
| 2013/0275722 | A1* | 10/2013 | Yap | G06F 9/30145 712/208 |
| 2014/0016773 | A1* | 1/2014 | Wolrich | G06F 21/72 380/28 |
| 2015/0381354 | A1 | 12/2015 | Yamada | |

FOREIGN PATENT DOCUMENTS

| | | |
|---|---|---|
| JP | H04-148372 A | 5/1992 |
| JP | 2010-258993 A | 11/2010 |
| JP | 2011-133916 A | 7/2011 |
| KR | 10-2009-0094086 A | 9/2009 |
| WO | 2013/089682 A1 | 6/2013 |

OTHER PUBLICATIONS

Jungk, et al. "Area-efficient FPGA Implementations of the SHA-3 Finalists", 2011 International Conference on Reconfigurable Computing and FPGAs, Date of Conference: 2011 (The year of publication for this reference is sufficiently earlier than the effective U.S. filing date and any foreign priority date so that the particular month of publication is not in issue.).

Bertoni, et al., "KECCAK implementation overview", Version 3.1, Sep. 5, 2011, (http://keccak.noekeon.org/files.html).

San, et al., "Compact Keccak Hardware Architecture for Data Integrity and Authentication on FPGAs", Information Security Journal: A Global Perspective, vol. 21, No. 5, pp. 231-242, Aug. 16, 2012.

Pereira, et al., "Exploiting Parallelism on Keccak: FPGA and GPU Comparison", Parallel & Cloud Computing, vol. 2, Issue 1, pp. 1-6, Jan. 2013.

Kavun, et al., "A Lightweight Implementation of Keccak Hash Function for Radio-Frequency Identification Applications", Lecure Notes in Computer Science, vol. 6370, 2010, pp. 258-269.

Bertoni, et al., "KECCAK implementation overview", Version 3.2, May 29, 2012, (http://keccak.noekeon.org/files.html).

Kerckhof, et al., "Compact FPGA Implementations of the Five SHA-3 Finalists", Lecture Notes in Computer Science, vol. 7079, Sep. 2011, pp. 217-233.

Kaps, et al., "Lightweight Implementations of SHA-3 Candidates on FPGAs", Lecture Notes in Computer Science, vol. 7107, Dec. 2011, pp. 270-289.

San, et al., "Compact Keccak Hardware Architecure for Data Integrity and Authentication on FPGAs", Information Security Journal: A Global Perspective, vol. 21 No. 5, 2012, pp. 231-242.

Latif, et al., "Novel Arithmetic Architecture for High Performance Implementation of SHA-3 Finalist Keccak on FPGA Platforms", Lecture Notes in Computer Science, vol. 7199, Mar. 2012, pp. 372-378.

Bertoni, et al., "The KECCAK reference", Version 3.0, Jan. 14, 2011, (http://keccak.noekeon.org/Keccak-reference-3.0.pdf).

International Search Report and Written Opinion for PCT/JP2014/054246 and notification of transmittal of the ISR/WO, dated May 13, 2014.

International Search Report and Written Opinion for PCT/JP2014/054245 and notification of transmittal of the ISR/WO, dated May 13, 2014.

Kavun, et al., "A Lightweight Implementation of Keccak Hash Function for Radio-Frequency Identification Applications", Lecure Notes in Computer Science, vol. 6370, 2010, pp. 258-269. (The year of publication for this reference is sufficiently earlier than the effective U.S. filing date and any foreign priority date so that the particular month of publication is not in issue.).

San, et al., "Compact Keccak Hardware Architecure for Data Integrity and Authentication on FPGAs", Information Security Journal: A Global Perspective, vol. 21 No. 5, 2012, pp. 231-242. (The year of publication for this reference is sufficiently earlier than the effective U.S. filing date and any foreign priority date so that the particular month of publication is not in issue.).

* cited by examiner

[Fig. 1A]
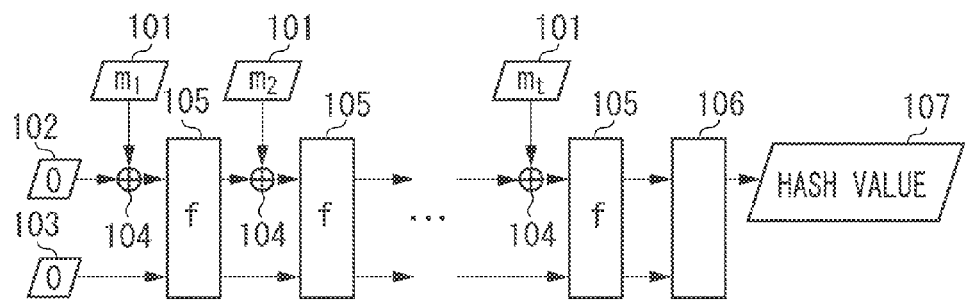
[Fig. 1B]
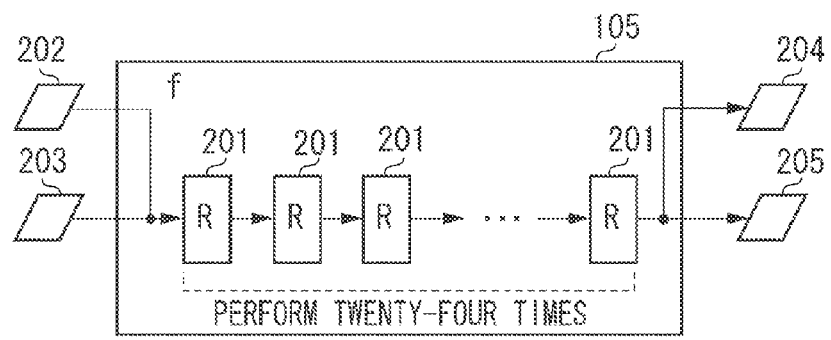
[Fig. 1C]
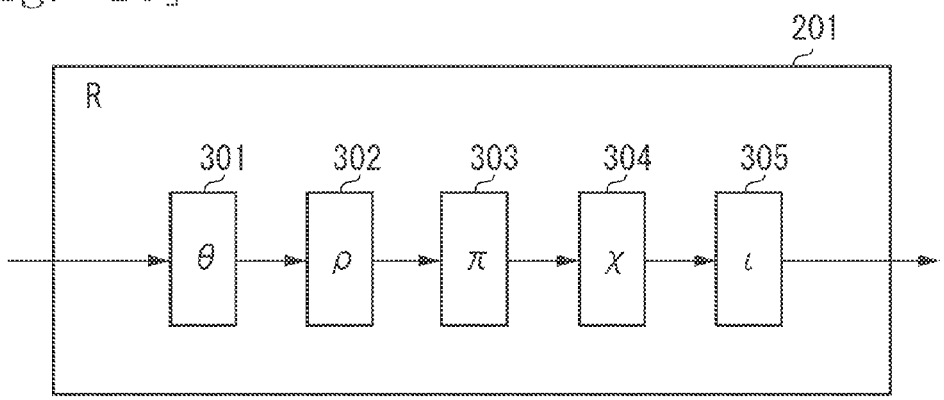

[Fig. 2A]
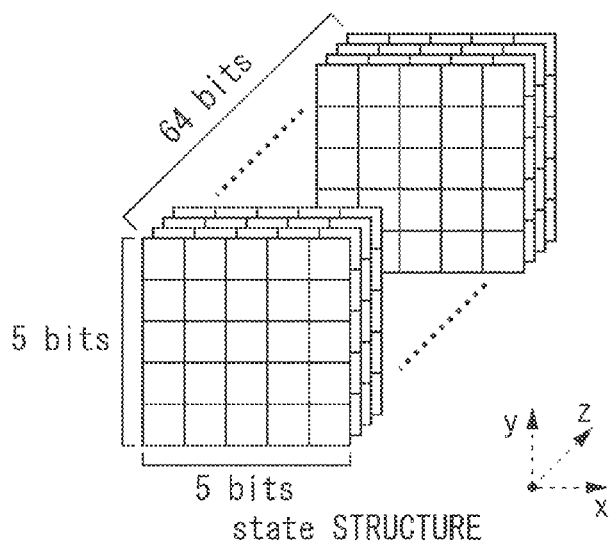
state STRUCTURE
[Fig. 2B]
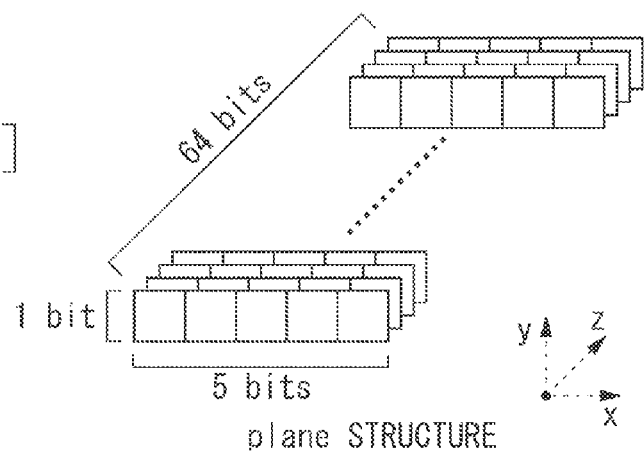
plane STRUCTURE
[Fig. 2C]
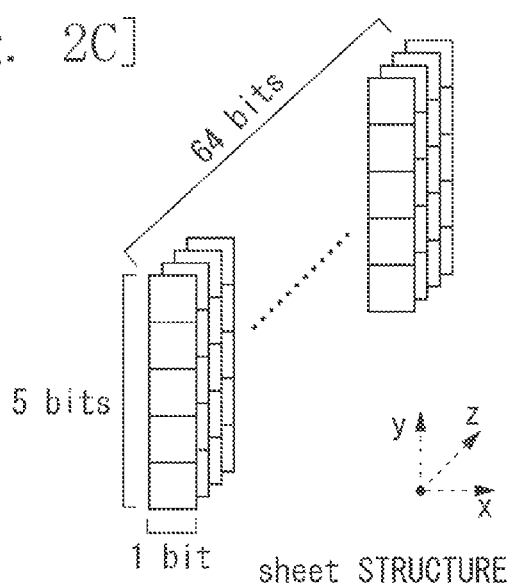
sheet STRUCTURE

[Fig. 2D]
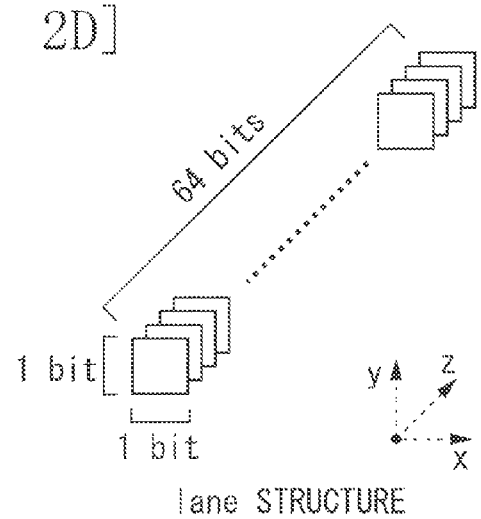
lane STRUCTURE
[Fig. 2E]
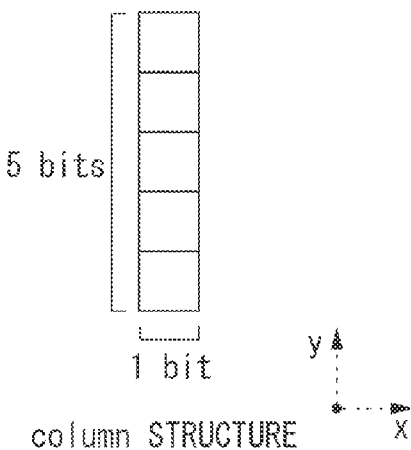
column STRUCTURE
[Fig. 2F]
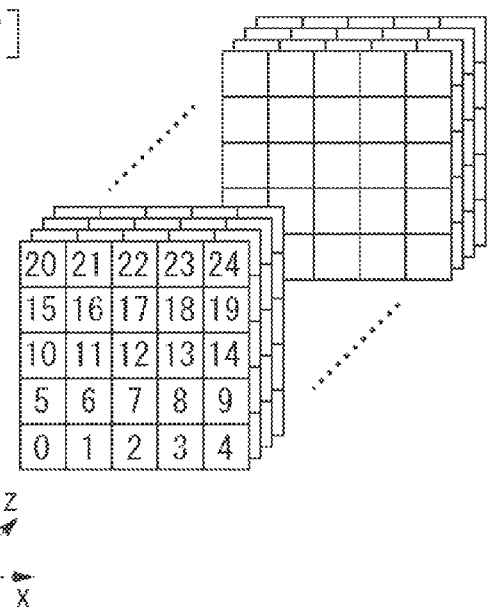

[Fig. 3A]
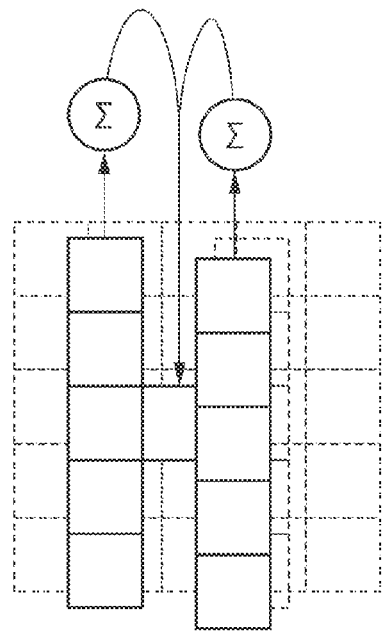
STEP θ
[Fig. 3B]
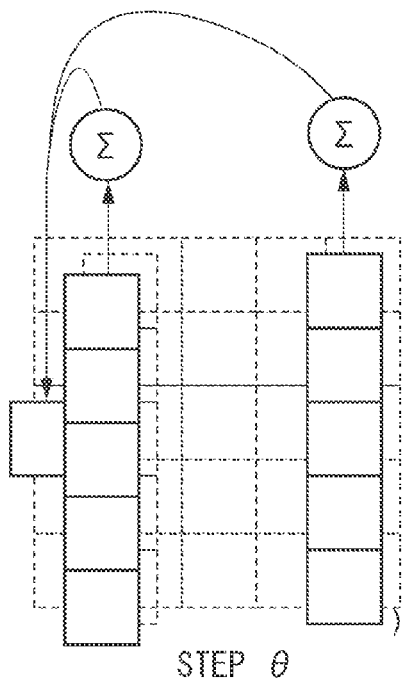
STEP θ
(UPON CALCULATION OF BIT AT X = 0)

[Fig. 4A]
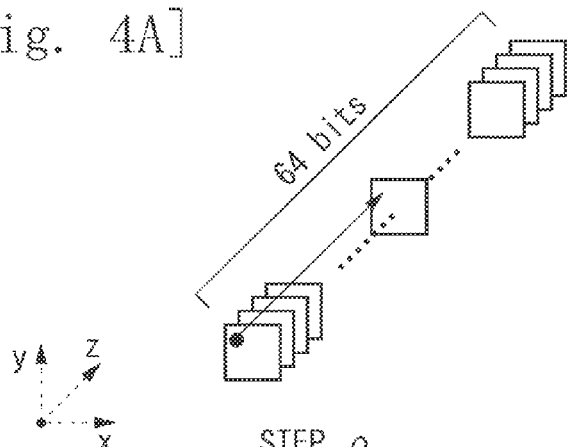
STEP ρ
[Fig. 4B]
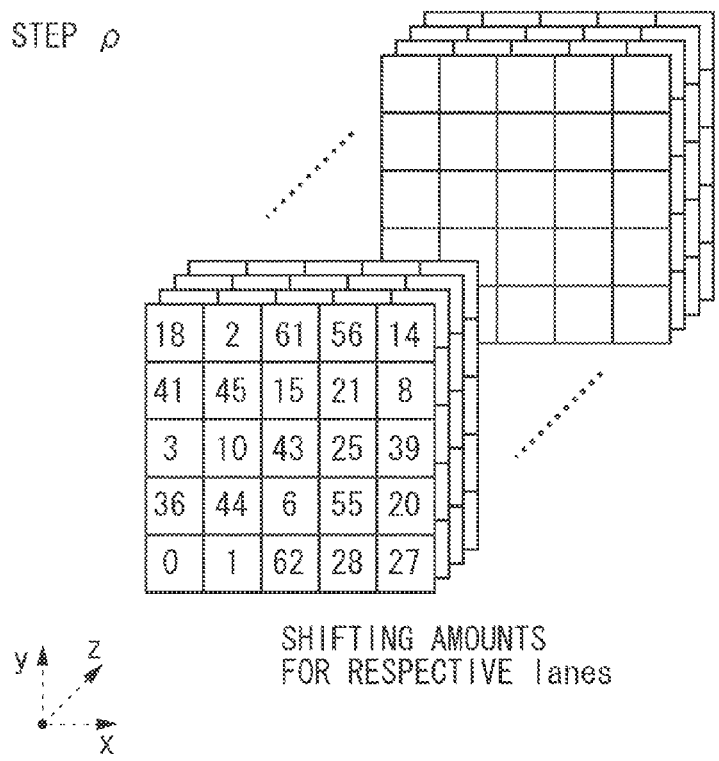
SHIFTING AMOUNTS
FOR RESPECTIVE lanes
[Fig. 4C]
| 18 | 2  | 61 | 56 | 14 |
|----|----|----|----|----|
| 41 | 45 | 15 | 21 | 8  |
| 3  | 10 | 43 | 25 | 39 |
| 36 | 44 | 6  | 55 | 20 |
| 0  | 1  | 62 | 28 | 27 |

[Fig. 5A]
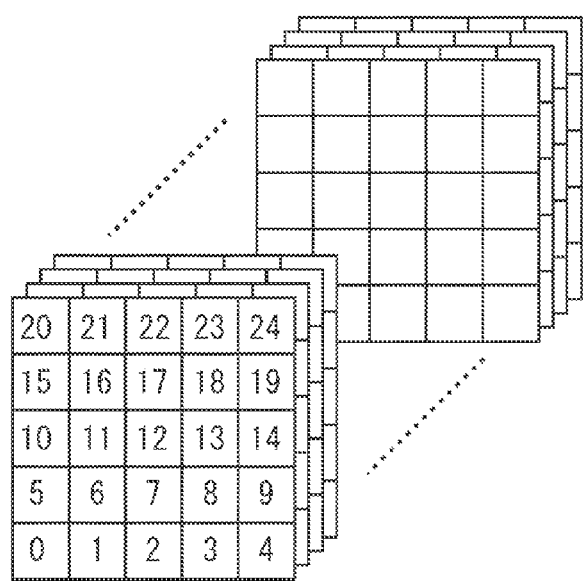
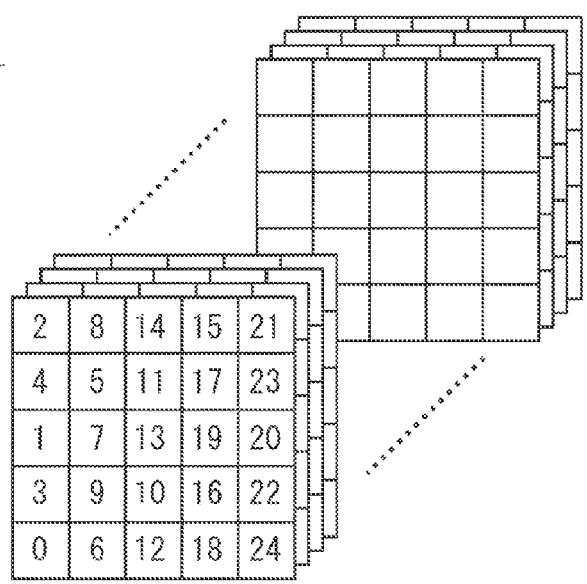
STEP π
[Fig. 5B]
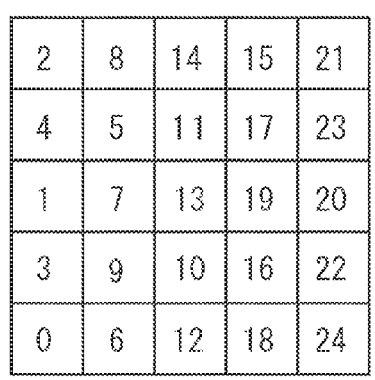

[Fig. 6]
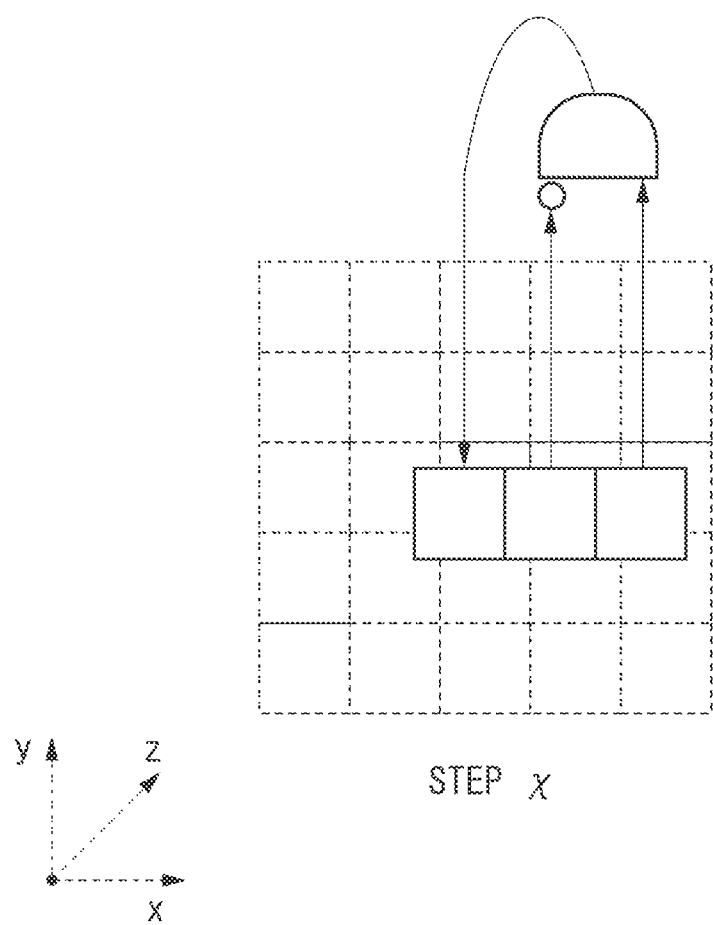
STEP χ

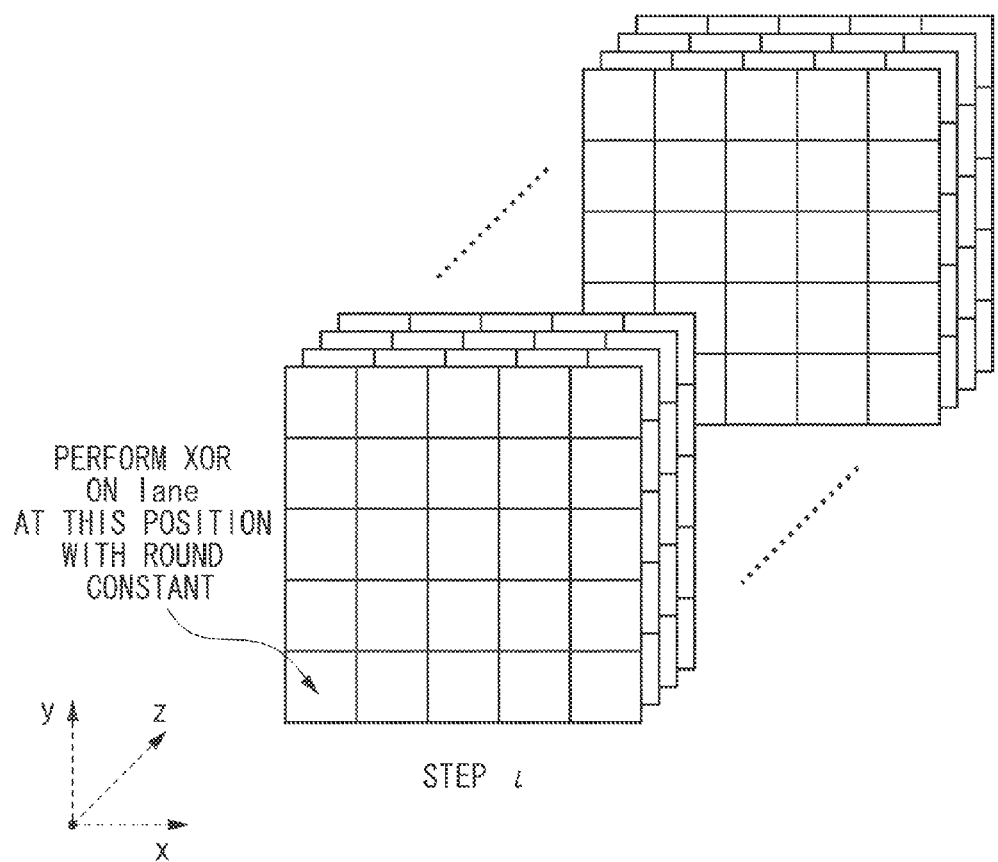
[Fig. 7]

[Fig. 8]

| NUMBER OF TIMES OF ROUND | ROUND CONSTANT |
|---|---|
| 1 | 0x0000000000000001 |
| 2 | 0x0000000000008082 |
| 3 | 0x800000000000808A |
| 4 | 0x8000000080008000 |
| 5 | 0x000000000000808B |
| 6 | 0x0000000080000001 |
| 7 | 0x8000000080008081 |
| 8 | 0x8000000000008009 |
| 9 | 0x000000000000008A |
| 10 | 0x0000000000000088 |
| 11 | 0x0000000080008009 |
| 12 | 0x000000008000000A |
| 13 | 0x000000008000808B |
| 14 | 0x800000000000008B |
| 15 | 0x8000000000008089 |
| 16 | 0x8000000000008003 |
| 17 | 0x8000000000008002 |
| 18 | 0x8000000000000080 |
| 19 | 0x800000000000800A |
| 20 | 0x800000008000000A |
| 21 | 0x8000000080008081 |
| 22 | 0x8000000000008080 |
| 23 | 0x0000000080000001 |
| 24 | 0x8000000080008008 |

[Fig. 9A]
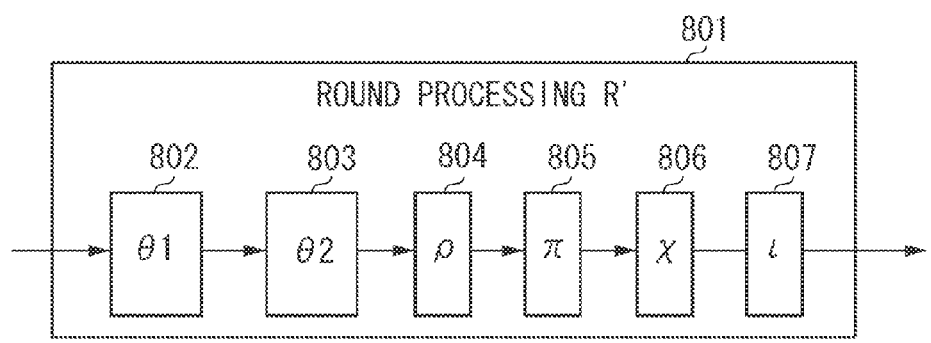
[Fig. 9B]
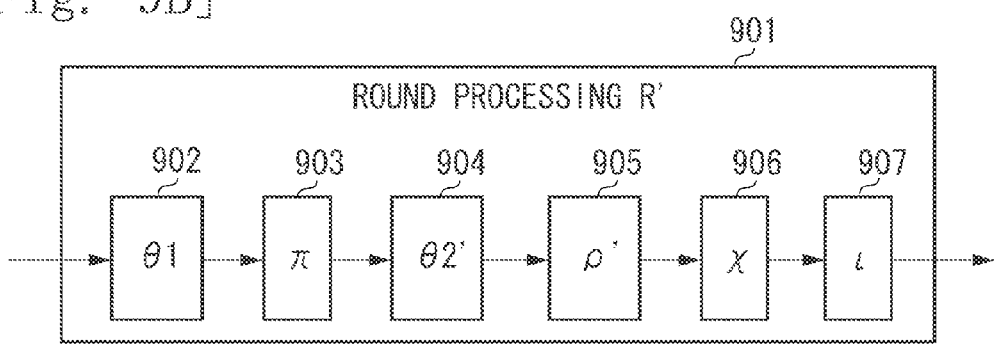
[Fig. 9C]
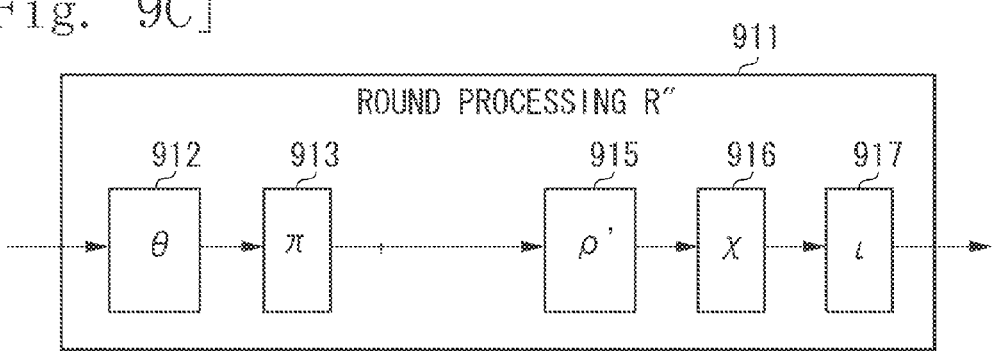

[Fig. 10A]
[Fig. 10B]
[Fig. 10C]
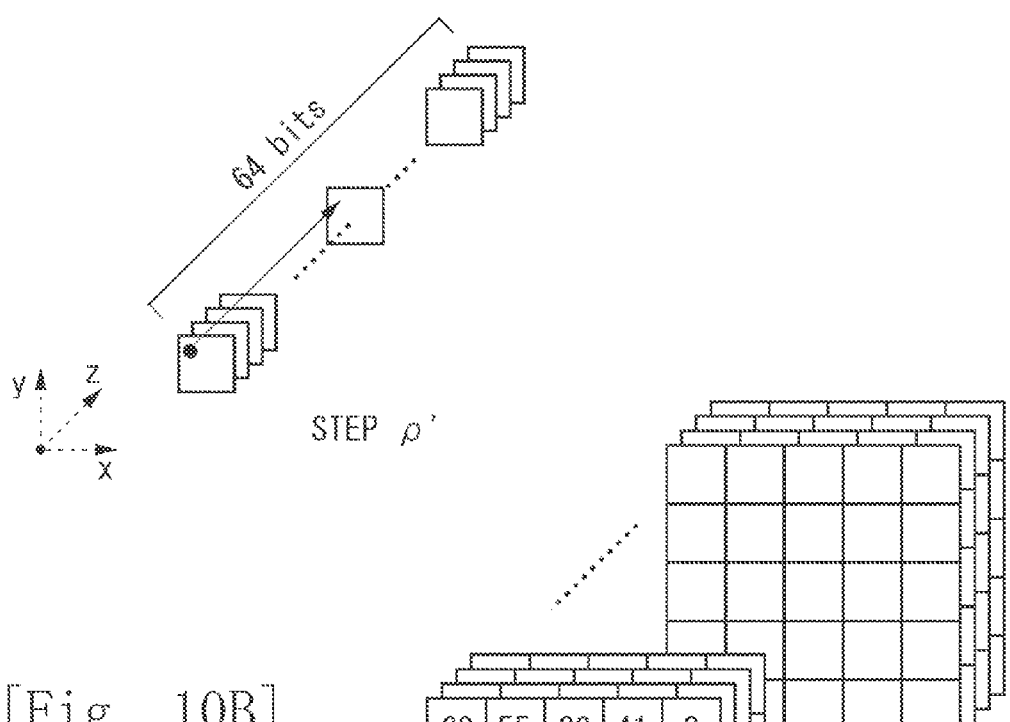
STEP ρ'
SHIFTING AMOUNTS

[Fig. 11]
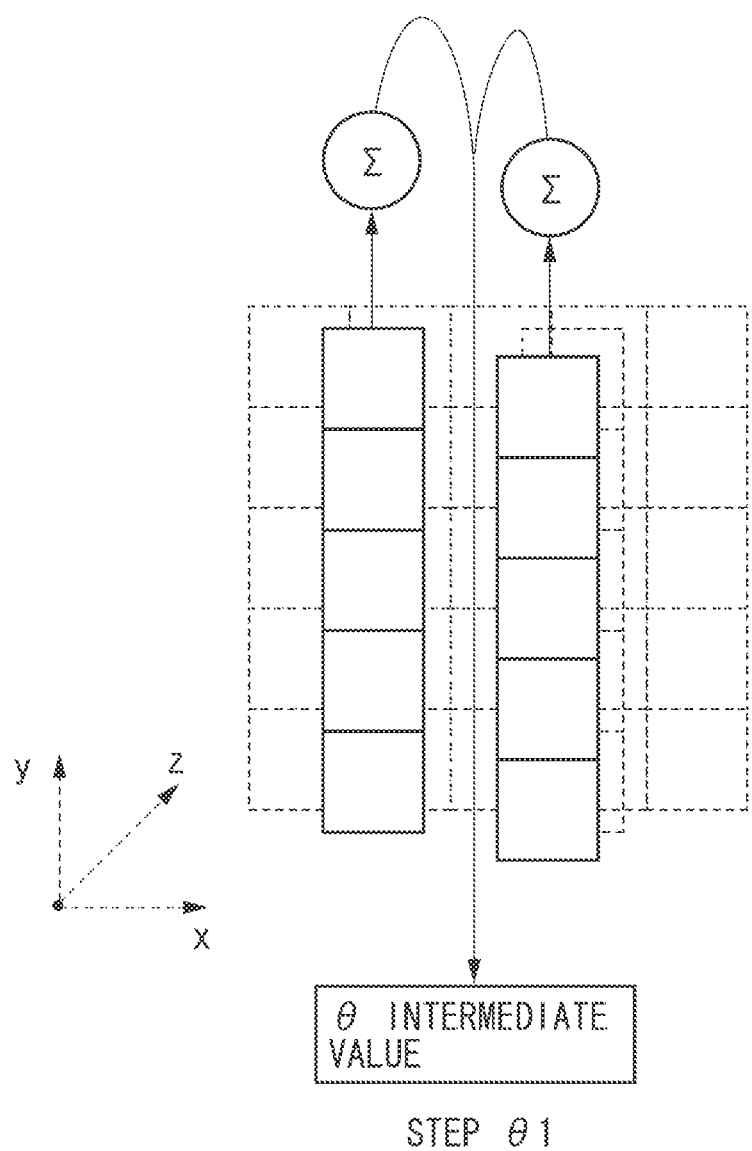

[Fig. 12]
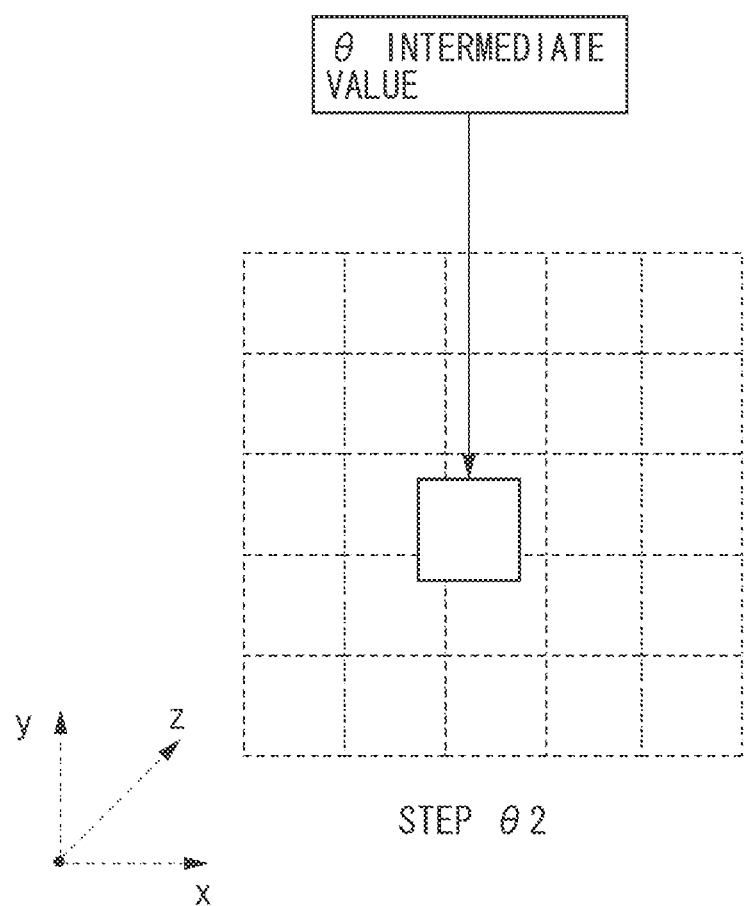

[Fig. 13A]
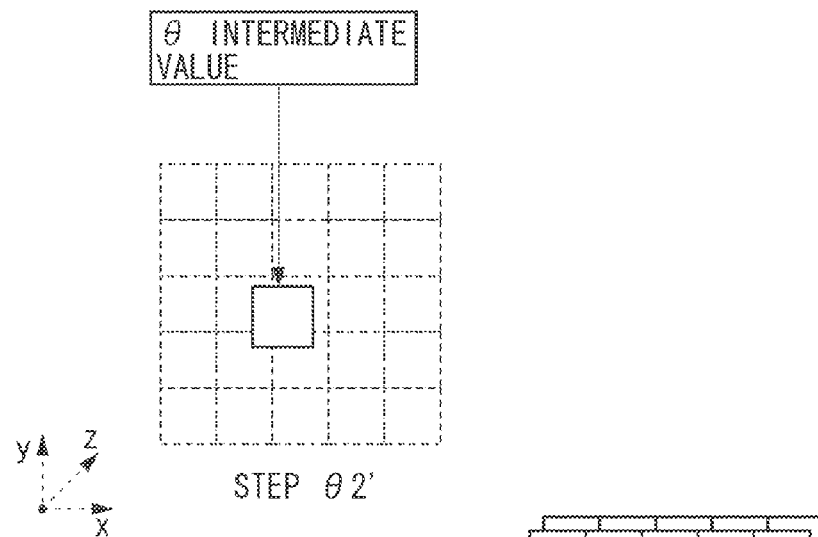
[Fig. 13B]
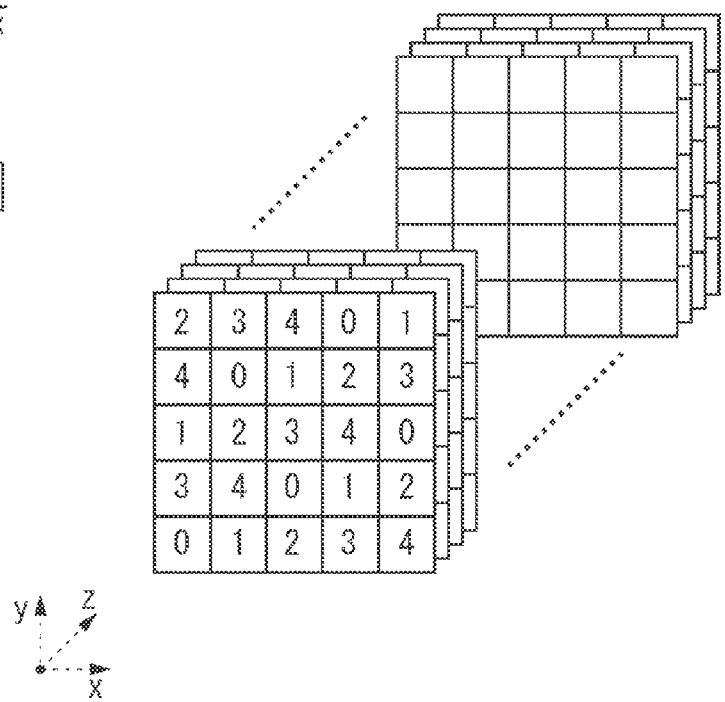
[Fig. 13C]
| 2 | 3 | 4 | 0 | 1 |
|---|---|---|---|---|
| 4 | 0 | 1 | 2 | 3 |
| 1 | 2 | 3 | 4 | 0 |
| 3 | 4 | 0 | 1 | 2 |
| 0 | 1 | 2 | 3 | 4 |

[Fig. 14A]

| clock | 0 | | | | | 5 | | | | | 10 | | | | | 15 | | | | | 20 |
|---|---|---|---|---|---|---|---|---|---|---|---|---|---|---|---|---|---|---|---|---|---|
| θ1 | 0 | 0 | 0 | 0 | 0 | 0 | | | | | | | | | | | | | | | |
| θ2&ρ&θ2&π | | | 0 | 0 | 0 | 0 | 0 | 0 | 0 | 0 | 0 | | | | | | | | | | |
| ?&x | | | | | | | | | 1 | 1 | 1 | 1 | 1 | 1 | 2 | 2 | 2 | 2 | 2 | 2 | |
| x&x | | | | | | | | | | | 0 | 0 | 0 | 0 | 1 | 1 | 1 | 1 | 1 | 1 | 1 |

[Fig. 14B]

| clock | 0 | | | | | 5 | | | | | 10 | | | | | 15 | | | | | 20 |
|---|---|---|---|---|---|---|---|---|---|---|---|---|---|---|---|---|---|---|---|---|---|
| θ1 | 0 | 0 | 0 | 0 | 0 | 1 | 1 | 1 | 1 | 1 | 1 | 2 | 2 | 2 | 2 | 2 | 3 | 3 | 3 | 3 | 3 |
| π | 0 | 0 | 0 | 0 | 0 | 1 | 1 | 1 | 1 | 1 | 1 | 2 | 2 | 2 | 2 | 2 | 3 | 3 | 3 | 3 | 3 |
| θ2, ρ', &χ&, ι@ | 0 | 0 | 0 | 0 | | 0 | 0 | 0 | 0 | 0 | 1 | 1 | 1 | 1 | 1 | 1 | 2 | 2 | 2 | 2 | 2 |

[Fig. 14C]
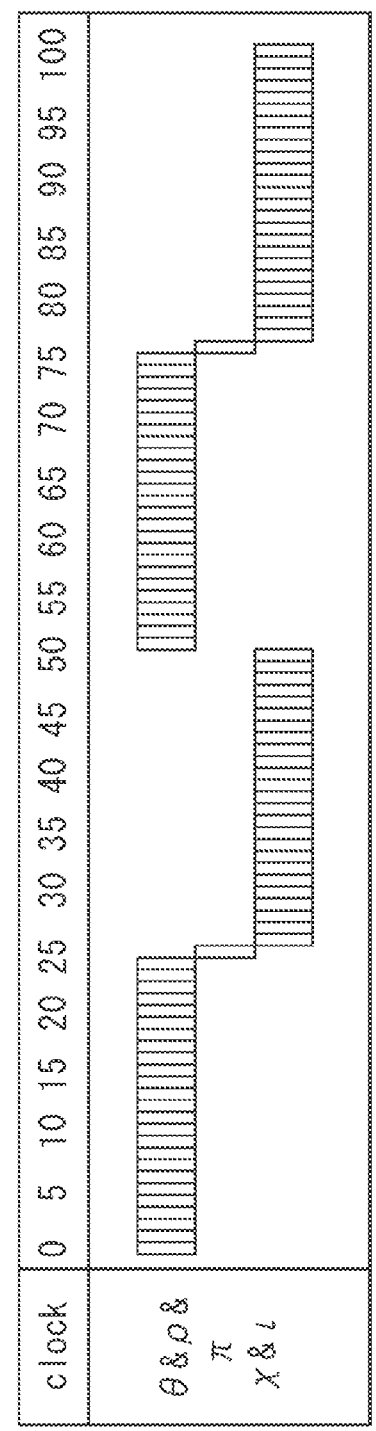

[Fig. 15]
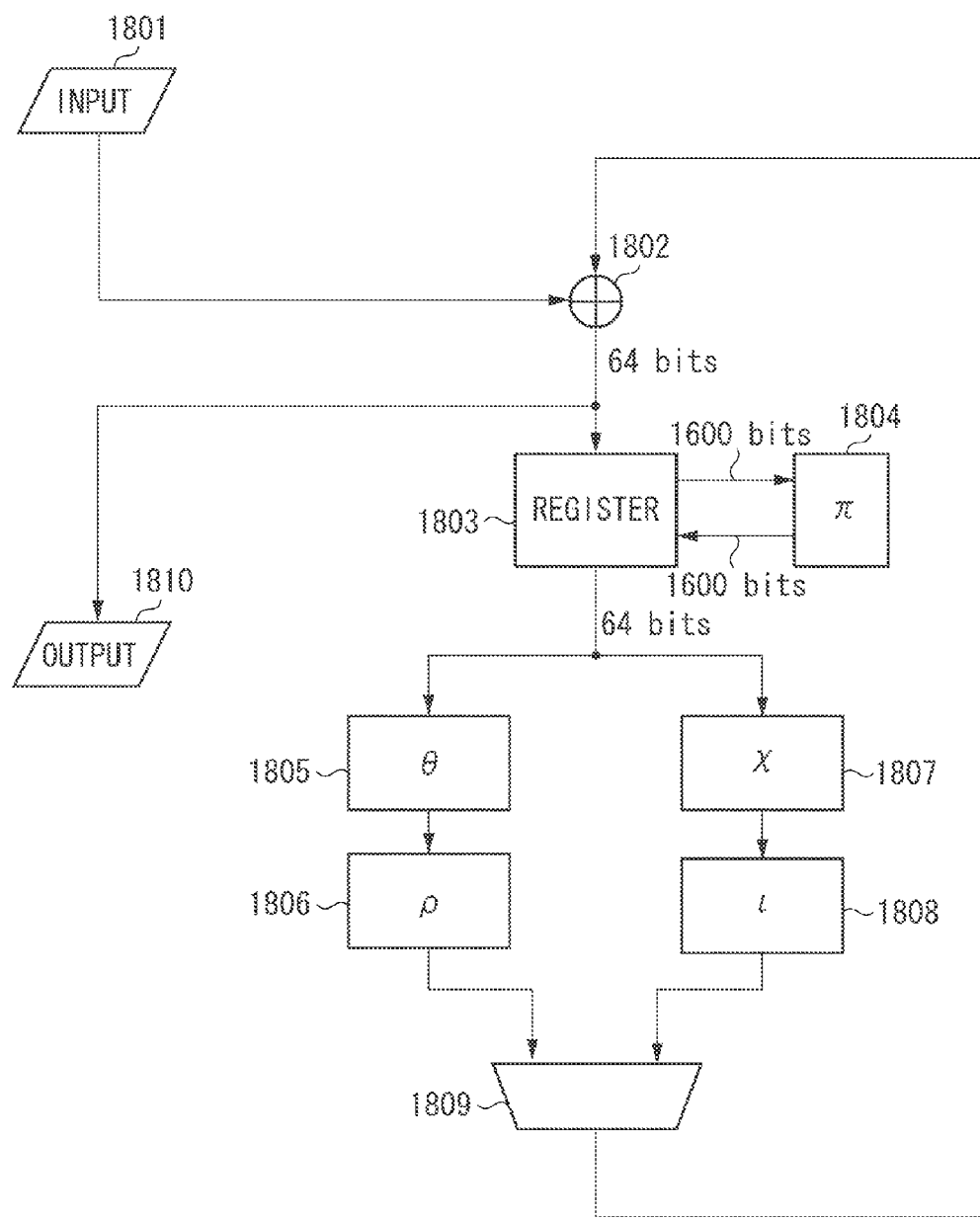

[Fig. 16]
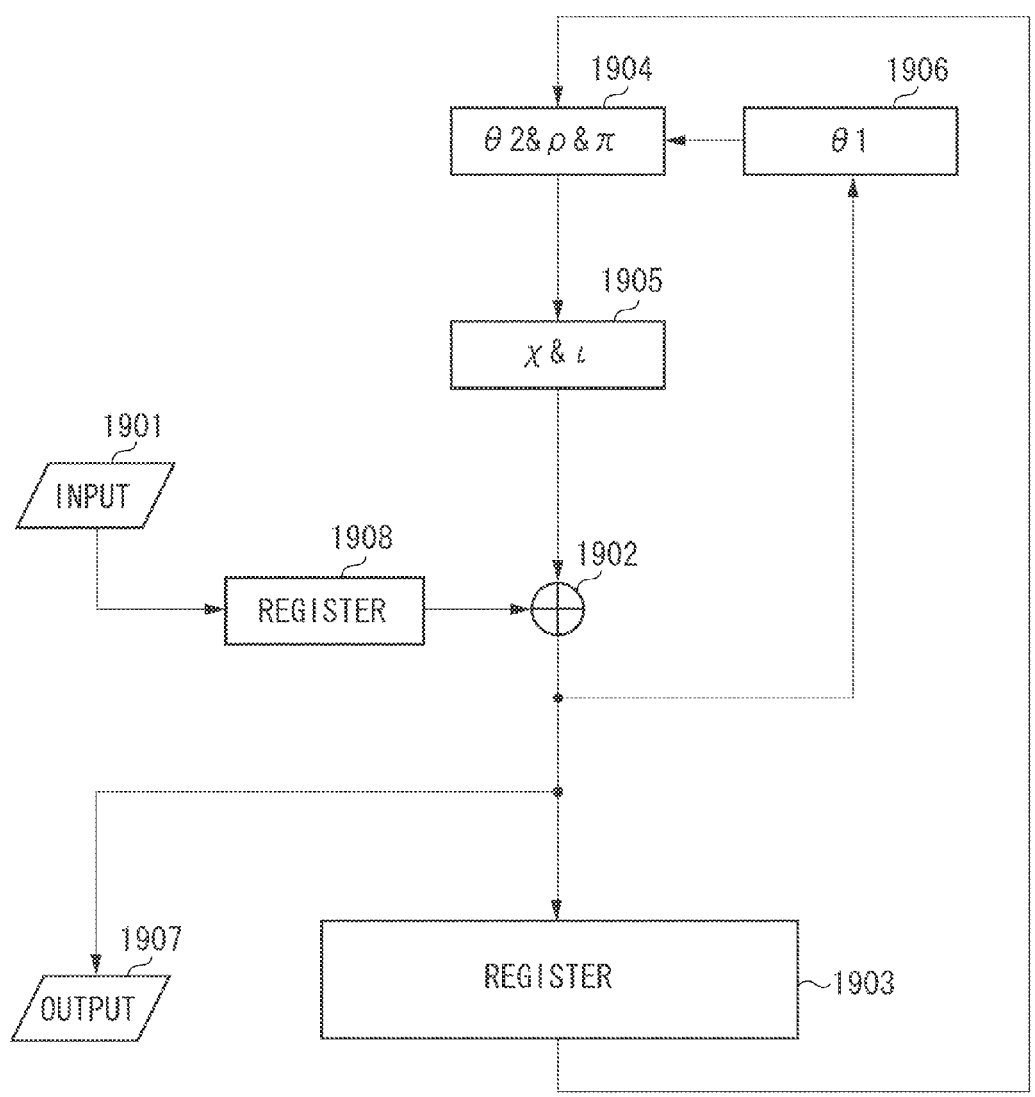

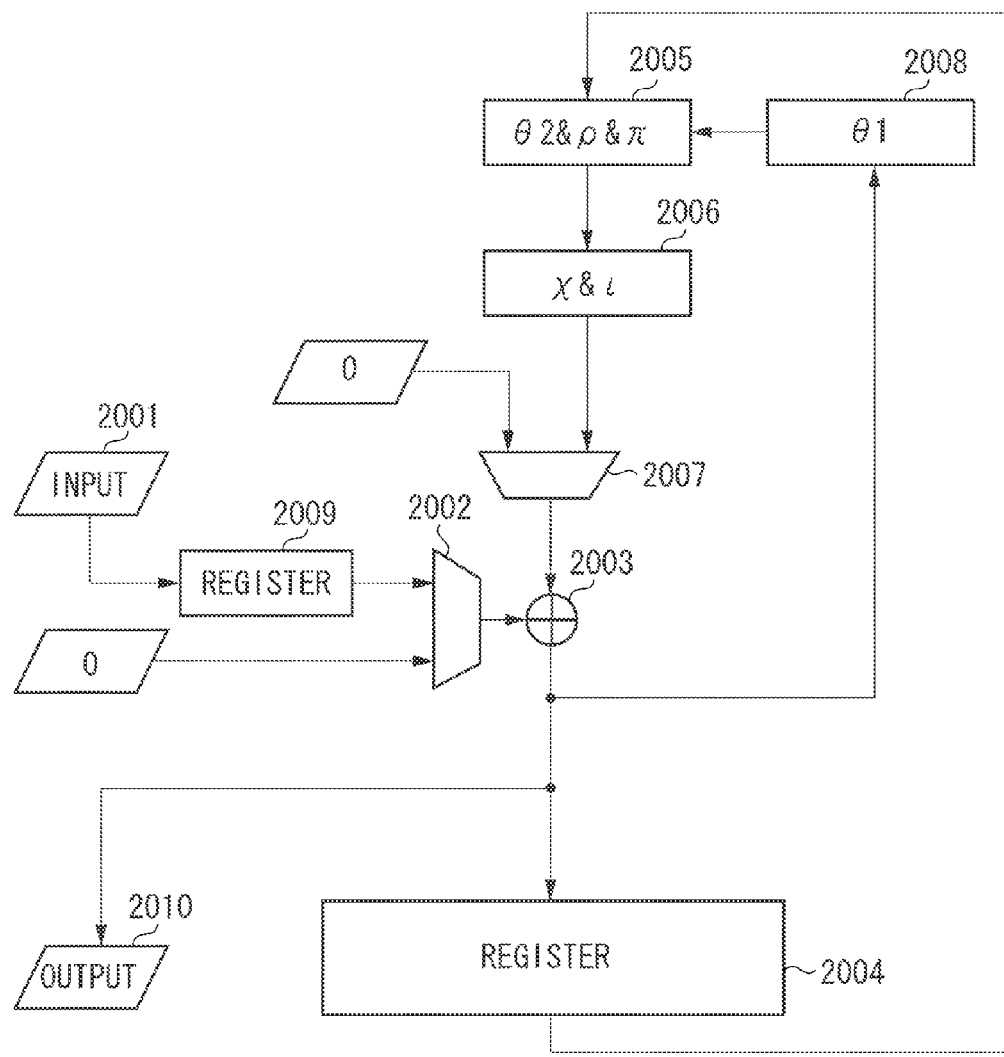
[Fig. 17]

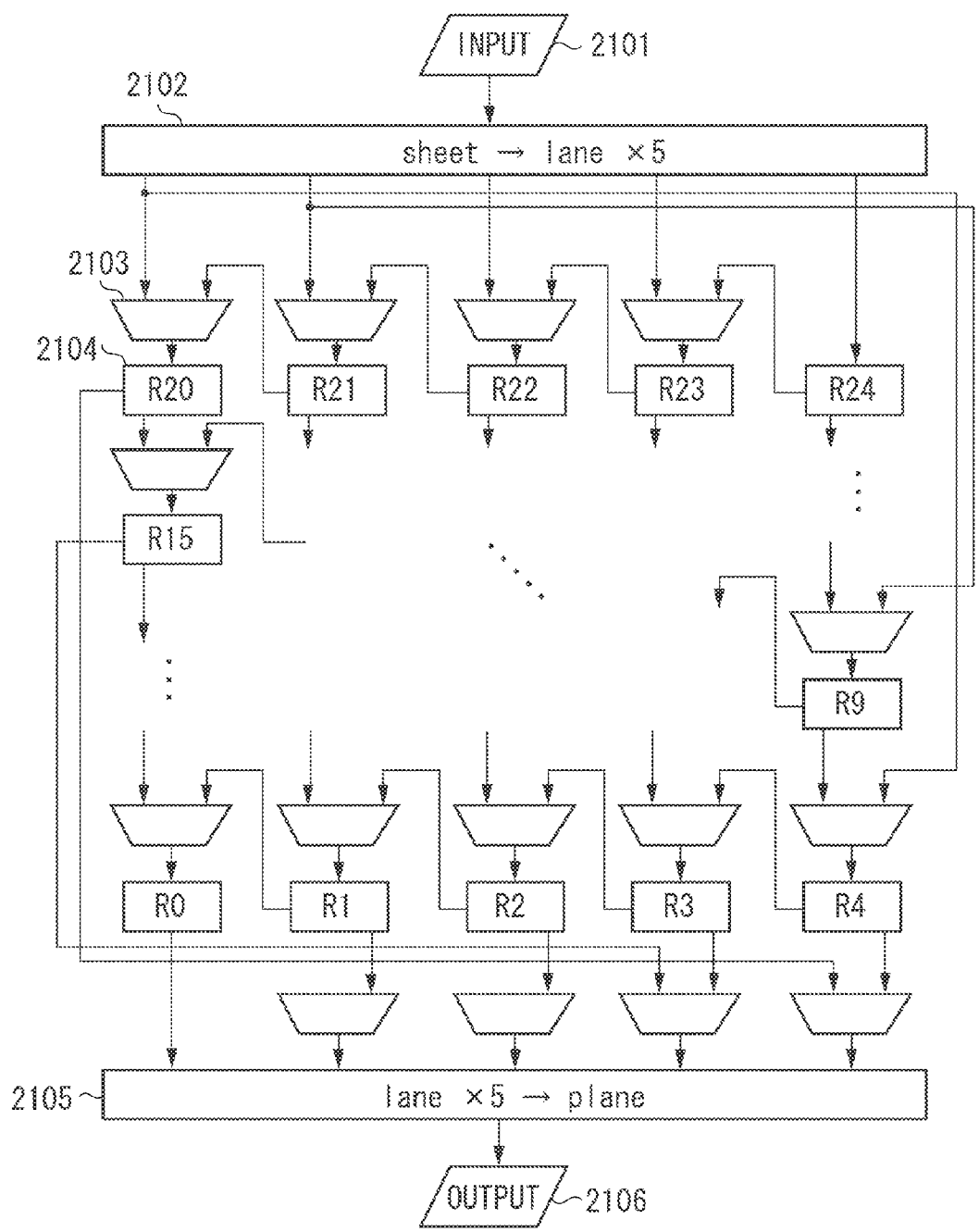
[Fig. 18]

[Fig. 19]
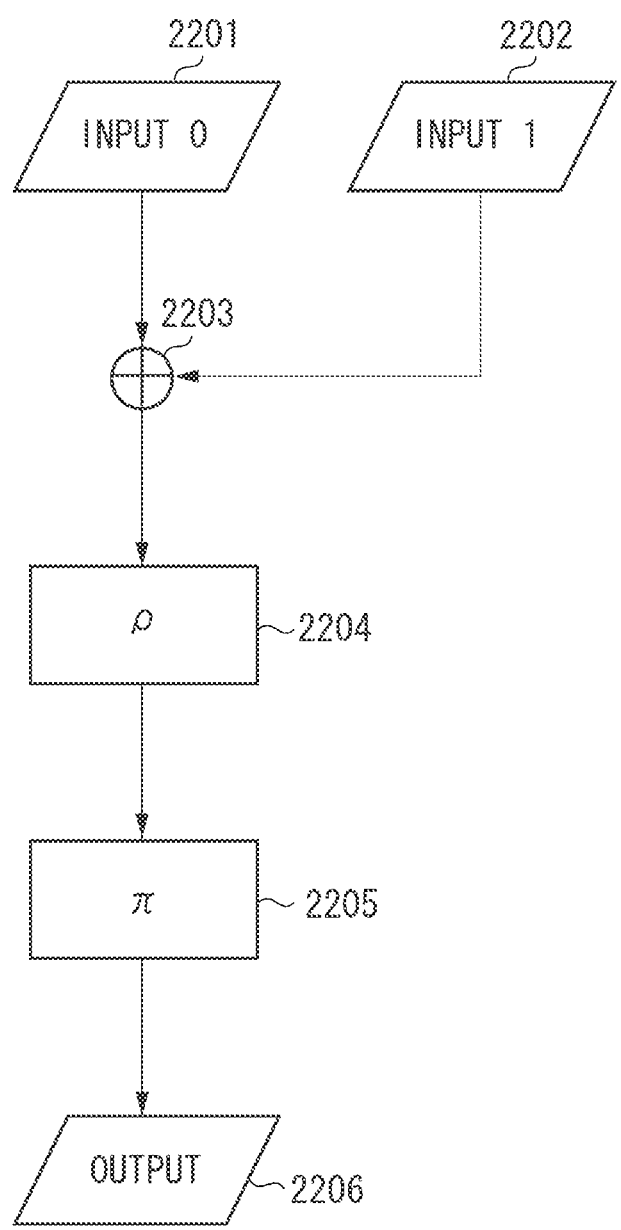

[Fig. 20]
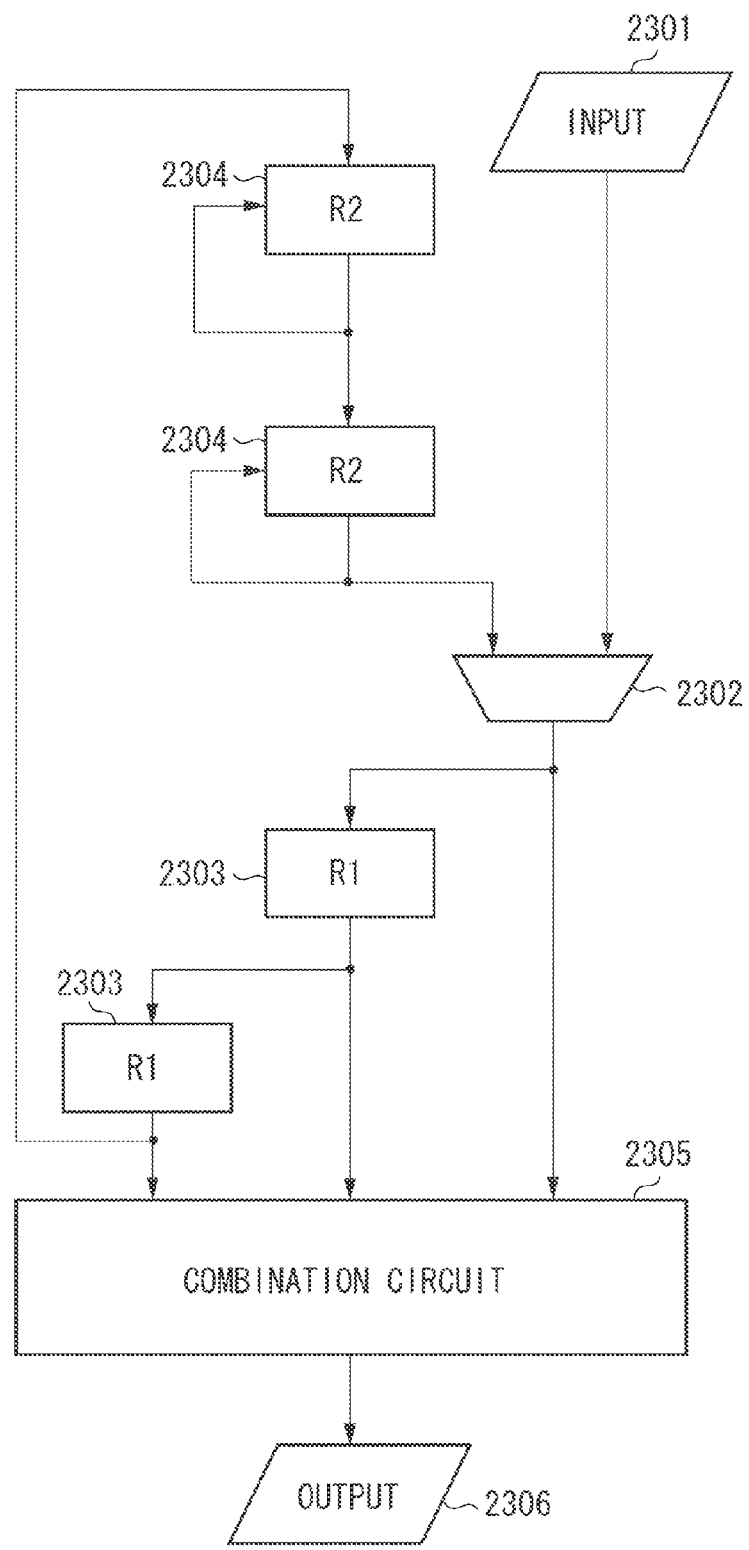

[Fig. 21]
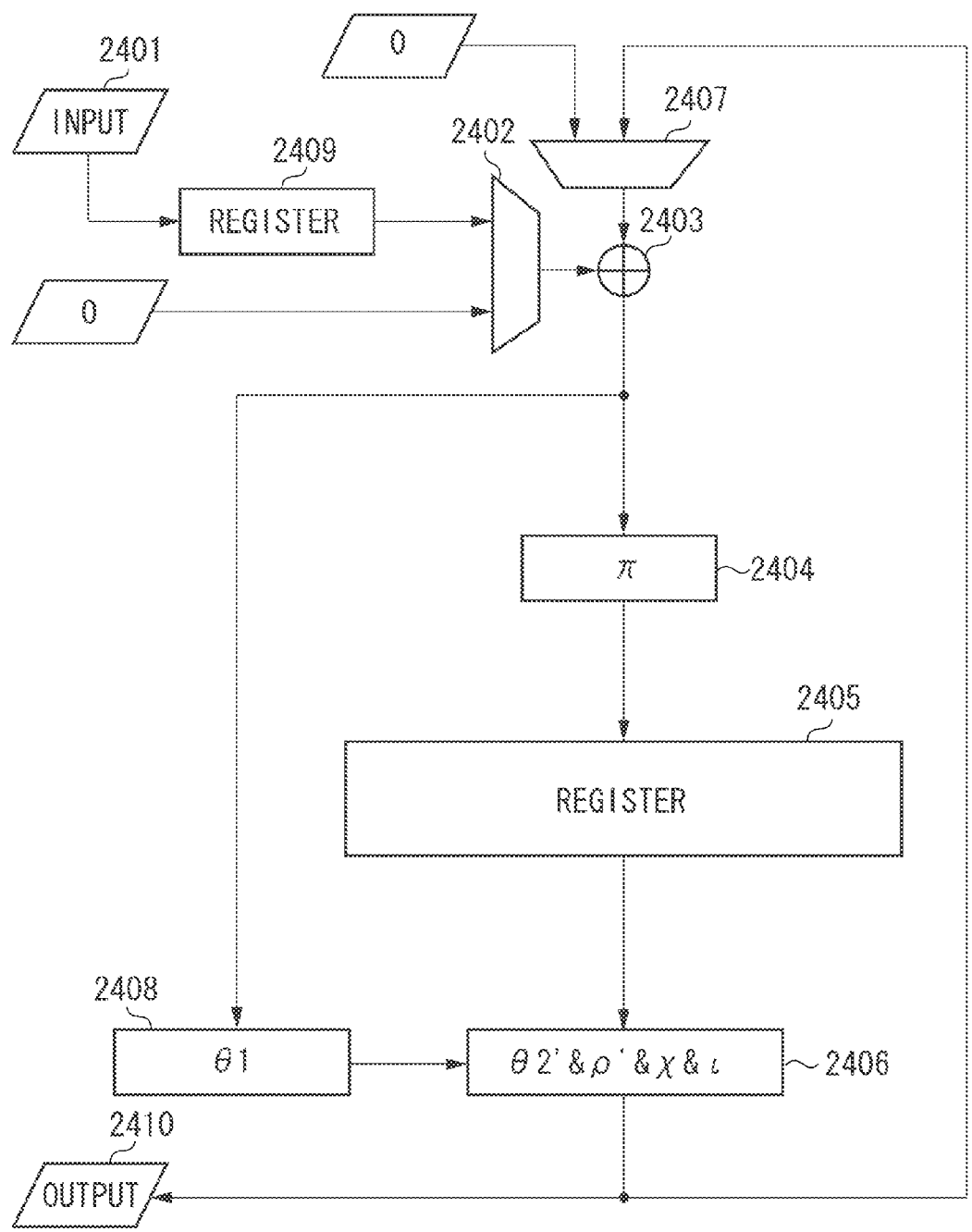

[Fig. 22]
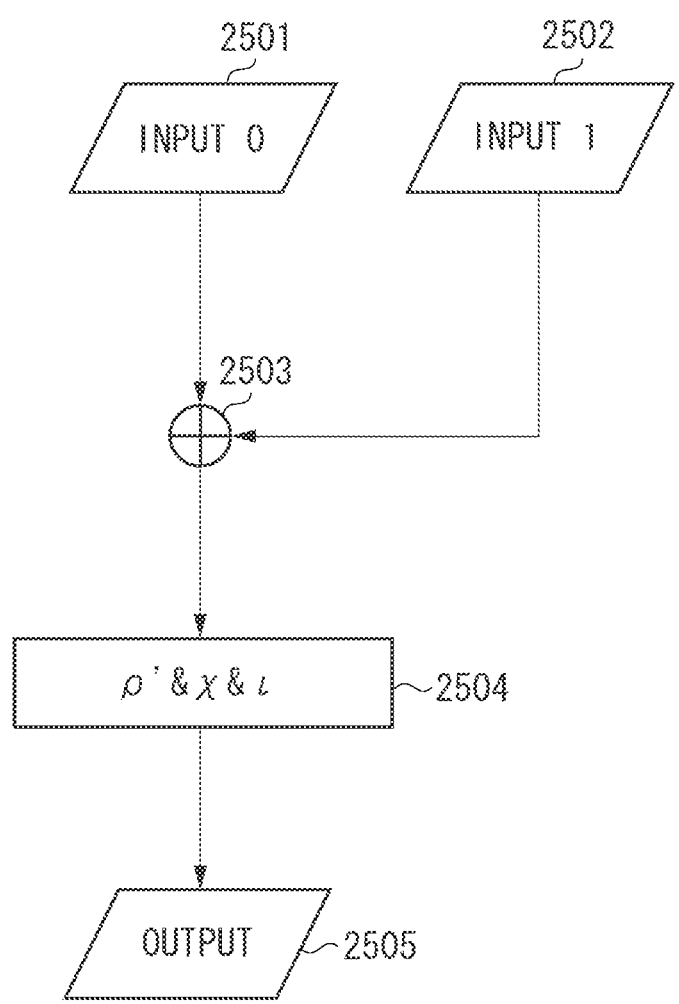

[Fig. 23A]
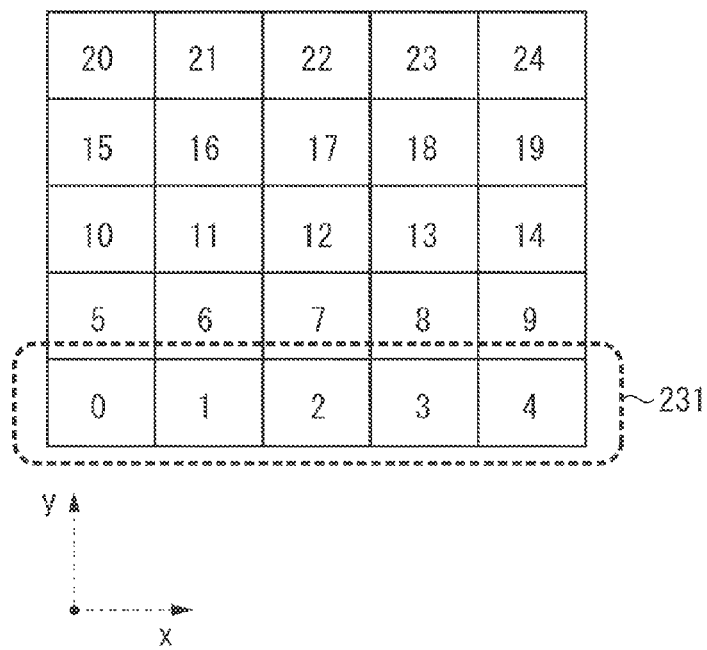
[Fig. 23B]
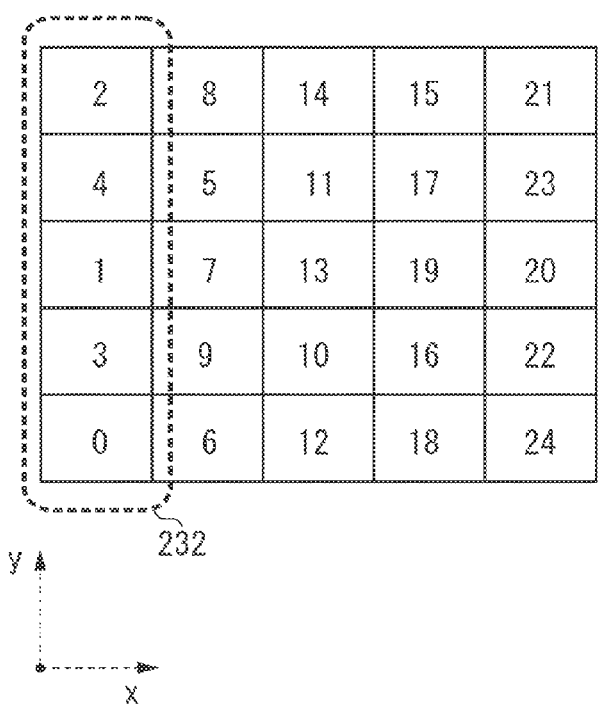

[Fig. 24A]
| 0 | 5 | 10 | 15 | 20 |
|---|---|----|----|----|
|   |   |    |    |    |
|   |   |    |    |    |
|   |   |    |    |    |
|   |   |    |    |    |
[Fig. 24D]
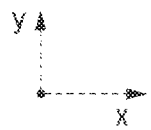
| 9 | 14 | 19 | 24 | 20' |
|---|----|----|----|-----|
| 8 | 13 | 18 | 23 | 15' |
| 7 | 12 | 17 | 22 | 10' |
| 6 | 11 | 16 | 21 | 5'  |
| 5 | 10 | 15 | 20 | 0'  |
[Fig. 24B]
| 1 | 6 | 11 | 16 | 21 |
|---|---|----|----|----|
| 0 | 5 | 10 | 15 | 20 |
|   |   |    |    |    |
|   |   |    |    |    |
|   |   |    |    |    |
[Fig. 24E]
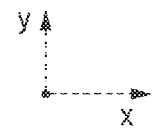
| 14 | 19 | 24 | 20' | 21' |
|----|----|----|-----|-----|
| 13 | 18 | 23 | 15' | 16' |
| 12 | 17 | 22 | 10' | 11' |
| 11 | 16 | 21 | 5'  | 6'  |
| 10 | 15 | 20 | 0'  | 1'  |
[Fig. 24C]
| 4 | 9 | 14 | 19 | 24 |
|---|---|----|----|----|
| 3 | 8 | 13 | 18 | 23 |
| 2 | 7 | 12 | 17 | 22 |
| 1 | 6 | 11 | 16 | 21 |
| 0 | 5 | 10 | 15 | 20 |

[Fig. 25]
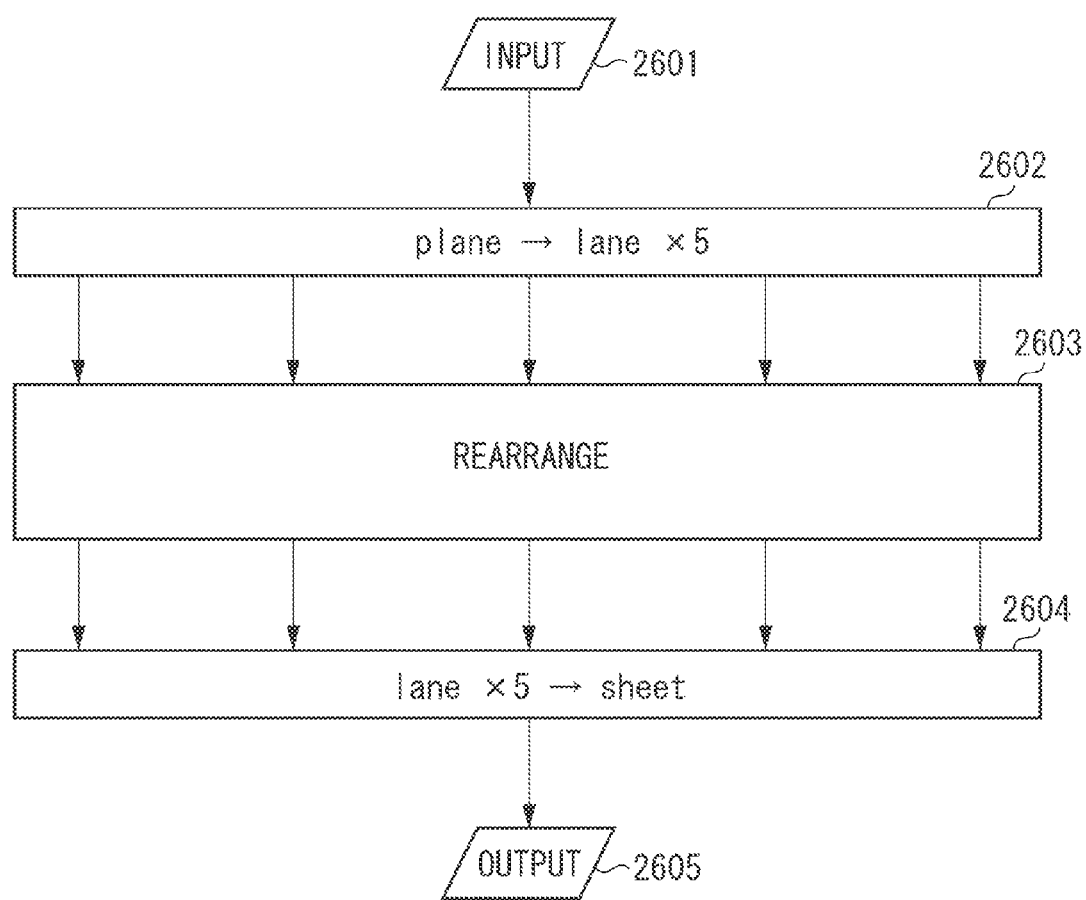

HASH VALUE GENERATING DEVICE

TECHNICAL FIELD

The present invention relates to technique for generating a hash value.

BACKGROUND ART

A hash value, which is calculated by using a cryptographic hash algorithm, is utilized for checking data alteration. It has been already verified that Secure Hash Algorithm 1 (SHA-1), which is a cryptographic hash algorithm (cryptographic hash), is not capable of securing safety. It has been pointed out that SHA-2 family (SHA-224, SHA-256, SHA-384, and SHA-512) may lack security. Therefore, National Institute of Standards and Technology (NIST) asked the public to come up with a new algorithm to establish a next-generation cryptographic hash algorithm (SHA-3). Then, the KECCAK algorithm ("The KECCAK reference", Version 3.0, Jan. 14, 2011, (http://keccak.noekeon.org/Keccak-reference-3.0.pdf)) was assigned as the SHA-3 in December 2012.

The SHA-3 outputs a cryptographic hash value of a fixed length from an input message (data) of any length. In the KECCAK algorithm, a permutation function is used, and in the permutation function, round processing of five sequential steps ($\theta$, $\rho$, $\pi$, $\chi$, and $\iota$) is repeated twenty-four times. The round processing is performed on data called a "state" data piece having a length of 1600 bits.

A lot of results of preceding processing has to be once stored in a memory for the $\theta$ processing and the $\pi$ processing out of the five steps of the round processing. Therefore, a lot of results of preceding processing has to be once stored in a memory twice within one-time round processing, and thus speedup has been difficult.

SUMMARY OF INVENTION

The present invention is directed to a technique to improve throughput for generating hash values.

According to an aspect of the present invention, a hash value generating device for generating a hash value based on KECCAK algorithm includes a $\theta$ processing means, a $\rho$ processing means, a $\pi$ processing means, a $\chi$ processing means, and an $\iota$ processing means for performing processing of five steps $\theta$, $\rho$, $\pi$, $\chi$, and $\iota$ included in round processing of the KECCAK algorithm, wherein the $\pi$ processing unit receives input of data in units of planes and outputs data in units of sheets.

Further features of the present invention will become apparent from the following description of exemplary embodiments with reference to the attached drawings.

BRIEF DESCRIPTION OF DRAWINGS

FIGS. 1A, 1B, and 1C are diagrams illustrating the KECCAK algorithm.

FIGS. 2A, 2B, 2C, 2D, 2E, and 2F are diagrams illustrating data structures.

FIGS. 3A and 3B are diagrams illustrating processing in step $\theta$.

FIGS. 4A, 4B, and 4C are diagrams illustrating processing in step $\rho$.

FIGS. 5A and 5B are diagrams illustrating processing in step $\pi$.

FIG. 6 is a diagram illustrating processing in step $\chi$.

FIG. 7 is a diagram illustrating processing in step $\iota$.

FIG. 8 is a diagram illustrating round constants in step $\iota$.

FIGS. 9A, 9B, and 9C are diagrams illustrating an overview of round processing R'.

FIGS. 10A, 10B, and 10C are diagrams illustrating processing in step $\rho'$.

FIG. 11 is a diagram illustrating processing in step $\theta 1$.

FIG. 12 is a diagram illustrating processing in step $\theta 2$.

FIGS. 13A, 13B, and 13C are diagrams illustrating processing in step $\theta 2'$.

FIGS. 14A, 14B, and 14C are operation timing charts.

FIG. 15 is a diagram illustrating a schematic configuration of an implementation example when processing is performed on a lane as a unit by the KECCAK algorithm.

FIG. 16 is a diagram illustrating a schematic configuration of an implementation example of the KECCAK algorithm according to a first exemplary embodiment.

FIG. 17 is a diagram illustrating more detail of the configuration illustrated in FIG. 16.

FIG. 18 is a diagram illustrating an implementation example of a register.

FIG. 19 is a diagram illustrating an implementation example of a $\theta 2$ & $\rho$ & $\pi$ circuit.

FIG. 20 is a diagram illustrating an implementation example of a $\chi$ & $\iota$ circuit.

FIG. 21 is a diagram illustrating a schematic configuration of an implementation example of the KECCAK algorithm according to a second exemplary embodiment.

FIG. 22 is a diagram illustrating an implementation example of a $\theta 2$ & $\rho'$ & $\chi$ & $\iota$ circuit.

FIGS. 23A and 23B are diagrams illustrating characteristics of processing in step $\pi$.

FIGS. 24A, 24B, 24C, 24D, and 24E are diagrams illustrating sheet-plane unit conversion performed by the register.

FIG. 25 is a diagram illustrating an implementation example of a $\pi$ circuit.

DESCRIPTION OF EMBODIMENTS

Various exemplary embodiments, features, and aspects of the invention will be described in detail below with reference to the drawings.

As a hash value generating device according to a first exemplary embodiment of the present invention, a device configured to generate a hash value of SHA-3 (KECCAK algorithm) will be hereinafter described as an example. In the description below, a specific data length or a specific bit value may be provided, but the present invention is not limited to the specific length or value.

First, the KECCAK algorithm will be described. Note that, specifications in more detail can be found in "The KECCAK reference", Version 3.0, Jan. 14, 2011, (http://keccak.noekeon.org/Keccak-reference-3.0.pdf).

FIG. 1A is a diagram illustrating a whole of the KECCAK algorithm. In FIG. 1A, message blocks 101 ($m_1$ to $m_t$) are illustrated. The message blocks 101 ($m_1$ to $m_t$) are generated by dividing an input message, for which a hash value is generated, into units of 1024-bit blocks.

As illustrated in FIG. 1A, all bits of initial values 102 and 103 are zeros in the present embodiment. Here, an example where all bits of initial values are zeros is described as an example, but the present invention is not limited to this example. The length of the initial value 102 is 1024 bits, which is the same as that of the message blocks described above, and the total length of the initial values 102 and 103 is 1600 bits. A bitwise exclusive OR (XOR) operator 104 is also illustrated. That is, the XOR operator 104 calculates exclusive OR for each bit of the two 1024-bit input data pieces and outputs the results as a 1024-bit data piece.

A KECCAK-f 105, which is a permutation function, receives two input data pieces and outputs two data pieces. The detail of the KECCAK-f 105 will be described below with reference to FIG. 1B. A cut-out section 106 cuts out a necessary size from the 1024-bit input data pieces, and outputs the cut out data. A cryptographic hash value (i.e., hash value) 107 is calculation results of this algorithm.

FIG. 1B is a diagram illustrating an overview of the KECCAK-f 105, which is a permutation function. Round processing R 201 is performed twenty-four times. The detail of the round processing R will be described below. Input data pieces 202 and 203 are illustrated. The length of the input data piece 202 is 1024 bits. The total length of the input data pieces 202 and 203 is 1600 bits. The two input data pieces 202 and 203 are coupled and then input to the round processing R 201. Output data pieces 204 and 205 are illustrated. The length of the output data piece 204 is 1024 bits. The total length of the output data pieces 204 and 205 is 1600 bits.

FIG. 1C is a diagram illustrating an overview of the round processing R 201. As described above, for the round processing R 201, the lengths of the input data piece and the output data piece are both 1600 bits. In the round processing R 201, processing of five steps (θ processing unit 301, ρ processing unit 302, π processing unit 303, χ processing unit 304, and ι processing unit 305) to be described below is sequentially performed on the input data piece to generate the output data piece.

Data structures used in the round processing of the KECCAK algorithm and the above five steps will be described in detail below.

FIG. 2A is a diagram illustrating a "state", which is a data structure upon input/output of the round processing R 201. As described above, both of the input data piece and the output data piece have 1600-bit length. Each of these 1600-bit data pieces is expressed as a rectangular parallelepiped having a width (x axis direction) of five bits, a height (y axis direction) of five bits, and a depth (z axis direction) of sixty-four bits in three-dimensional arrangement. The rectangular parallelepiped data structure is called a "state". A 1600-bit data piece is allocated to the state structure expressed as a rectangular parallelepiped in the order of the z axis direction, the x axis direction, and the y axis direction. The detail will be described below with reference to FIG. 2F.

FIG. 2B is a diagram illustrating a data structure "plane". The plane structure is expressed as a planar structure that is parallel to the x-z plane and that has a width of five bits, a height of one bit, and a depth of sixty-four bits. That is, the above "state" structure can be considered as five plane structures that are stacked in the y axis direction.

FIG. 2C is a diagram illustrating a data structure "sheet". The sheet structure is expressed as a planar structure that is parallel to the y-z plane and that has a width of one bit, a height of five bits, and a depth of sixty-four bits. That is, the above "state" structure can be considered as five sheet structures arranged horizontally in line in the x axis direction.

FIG. 2D is a diagram illustrating a data structure "lane". The lane structure is expressed as a linear structure that is parallel to the z axis and that has a width of one bit, a height of one bit, and a depth of sixty-four bits. That is, the above "state" structure can be considered as twenty-five lane structures gathered along the x-y plane. FIG. 2F is a diagram illustrating the order of twenty-five lanes included in one state structure.

FIG. 2E is a diagram illustrating a data structure "column". The column structure is expressed as a linear structure that is parallel to the y axis and that has a width of one bit, a height of five bits, and a depth of one bit. That is, the above "sheet" structure can be considered as sixty-four column structures arranged in line in the z axis direction.

In the first exemplary embodiment, a case where the input data piece is 1600 bits are described, but the present invention is not limited to the case. In addition, an example where data of the state structure is handled as a rectangular parallelepiped data structure having a width (x axis direction) of five bits, a height (y axis direction) of five bits, and a depth (z axis direction) of sixty-four bits will be described, but the present invention is not limited thereto. For example, an input data piece may have 800 bits, and the state structure data may be handled as a rectangular parallelepiped data structure having a width of five bits, a height of five bits, and a depth of thirty-two bits.

Further, the plane structure, the sheet structure, the lane structure, and the column structure can be modified according to the respective numbers of bits in the width (x axis direction), in the height (y axis direction), and in the depth (z axis direction) of the state structure. More specifically, when the state structure data has m bits in the x axis direction, n bits in the y axis direction, and s bits in the z axis direction, the plane structure is a planar structure having m bits in the x axis direction, one bit in the y axis direction, and s bits in the z axis direction. The sheet structure is a planar structure having one bit in the x axis direction, n bits in the y axis direction, and s bits in the z axis direction. The lane structure is a linear structure having one bit in the x axis direction, one bit in the y axis direction, and s bits in the z axis direction. The column structure is a linear structure having one bit in the x axis direction, n bits in the y axis direction, and one bit in the z axis direction.

Next, a method of forming an input data piece for the first round processing R 201 from the input data pieces 202 and 203 that have been input to the KECCAK-f 105 will be described. First, the input data pieces 202 and 203 are coupled in this order to form a 1600-bit data block. Next, the 1600-bit data block is divided into units of sixty-four bits to form twenty-five lanes. Last, the twenty-five lanes are arranged in the order illustrated in FIG. 2F along the x-y plane to build one state. The thus generated state structure is input to the round processing R 201. A method of forming the output data pieces 204 and 205 from an output data piece of the twenty-fourth round processing R 201 is similar, and thus the description thereof is not provided.

Next, five steps (steps θ, ρ, π, χ, and ι) included in the round processing R 201 will be described. In each of the steps, the data structure of an input data piece and an output data piece is the state structure.

FIG. 3A is a diagram illustrating processing in the step θ (θ processing unit 301). The step θ is processing of adding the sum of two columns to each bit, the two columns being adjacent to the bit. The θ processing unit calculates each bit of the output state as the sum of three values obtained from the input state: "a value of a bit at the same position"; "the sum of bits of a column at a position of −1 in the x axis direction"; and "the sum of bits of a column at a position of +1 in the x axis direction and −1 in the z axis direction". Here, the sum means the sum on GF(2), and the result will be the same as that of the exclusive OR operation. The processing can be expressed by the following expression.

$$a'[x][y][z] \leftarrow a[x][y][z] + \sum_{y'=0}^{4} a[x-1][y'][z] + \sum_{y'=0}^{4} a[x+1][y'][z-1]$$

In the expression, x is 0 to 4, y is 0 to 4, z is 0 to 63.

FIG. 3B is a diagram illustrating processing in the step θ upon calculation of a bit in an end part (x=0, for example). In order to calculate a bit at x=0, "a column at a position of −1 in the x axis direction" corresponds to a column opposite in the state, that is, "the column at a position of x=4". As described above, a coordinate beyond the state is regarded as a position that is opposite in the state. That is, coordinate values are cyclically shifted in the same state. This rule is similarly applied to x coordinate, y coordinate, and z coordinate and to four other steps.

FIGS. 4A, 4B, and 4C are diagrams illustrating processing in the step ρ (ρ processing unit 302). The step ρ is processing of shifting values of respective bits in the z axis direction. More specifically, the ρ processing unit 302 cyclically shifts values in each lane of the state in the z direction by the specified number of bits as illustrated in FIG. 4A and outputs the shifted values. The number of bits by which the values are shifted in each lane is previously determined as the number illustrated in FIG. 4B. Note that, in order to perform the ρ processing, a holding section previously holds a table listing shifting amounts as illustrated in FIG. 4C and the ρ processing unit 302 performs the ρ processing using the table being held.

FIGS. 5A and 5B are diagrams illustrating processing in the step π (π processing unit 303). The step π is processing of rearranging each of the respective bits in the x-y plane, that is, processing of rearranging twenty-five lanes in a single state. Note that the x-y plane may be also referred to as a "slice". More specifically, when respective lanes in the input state are numbered as illustrated in the upper part of FIG. 5A, the output state is illustrated in the lower part thereof. Note that, in order to perform the π processing, the holding section previously holds a table listing rearrangement destinations as illustrated in FIG. 5B and the π processing unit 303 performs the π processing using the table being held.

FIG. 6 is a diagram illustrating processing in the step χ (χ processing unit 304). The step χ is processing of converting a bit using bits in a line in the x axis direction (also referred to as a "row"), and each bit in the output row is derived based on three bits in the same input row. More specifically, setting is made such that when a bit at a position of +1 in the x axis direction from each bit of the input row is 0 and a bit at a position of +2 in the x axis direction from the bit is 1, the χ processing unit 304 inverts the value of the each corresponding bit of the output row.

FIG. 7 is a diagram illustrating processing in the step ι (ι processing unit 305). The step ι is processing of adding a round constant to each bit. FIG. 8 is a diagram illustrating round constants used in the step ι. In the step ι, the ι processing unit 305 performs exclusive OR (XOR) on a bit line of a lane at x=y=0 with a round constant (64-bit value) predetermined for each round. More specifically, the ι processing unit 305 calculates bitwise exclusive OR of a 64-bit value of a lane at x=y=0 (when a bit at z=63 is MSB and a bit at z=0 is LSB) and a round constant illustrated in FIG. 8. Then, the ι processing unit 305 sets the result as a bit line of a lane at x=y=0 in the output state.

From the processing contents of the above respective steps (steps θ, ρ, π, χ, and ι), it can be understood that there are following limitations regarding start of the processing of the respective steps.

In the step θ, the θ processing unit 301 uses a sheet data piece at −1 and a sheet data piece at +1 in the x axis direction to calculate each lane in the state. Therefore, when the first three sheets are completed, that is, when the θ processing unit 301 receives twenty-three lanes out of the twenty-five lanes from a preceding stage, the θ processing unit 301 can start the processing in the step θ.

The step ρ is calculation for each of lanes independent of each other. Therefore, when one lane of calculation results of the preceding stage (step θ) is output, the ρ processing unit 302 can start the processing in the step ρ.

In the step π, respective lanes in a state are rearranged. Therefore, when one whole state of calculation results of the preceding stage (step ρ) is output, that is, when twenty-five lanes are output, the π processing unit 303 can start the processing in the step π.

In the step χ, in calculation of each lane in a state, the χ processing unit 304 uses a lane at +1 in the x axis direction and a lane at +2 in the x axis direction. Therefore, upon receiving three lane data pieces, the χ processing unit 304 can start the processing in the step χ.

The step ι is calculation for each of lanes independent of each other. Therefore, when one lane of calculation results of the preceding stage (step χ) is output, the ι processing unit 305 can start the processing in the step ι.

In other words, in the steps θ, π, and χ, start of processing has to wait until the steps at the respective preceding stages output calculation results of twenty-three lanes, twenty-five lanes, and three lanes respectively. As described above, particularly the processing of the two steps θ and π can be started when a long time has passed after the start of processing of their preceding stages.

This means that throughput can be improved when the starting time of the step θ or the step π can be hastened. In addition, throughput can be improved by performing the processing in units of planes or units of sheets instead of the unit of lanes in each step.

Next, round processing R' 801 will be described. The round processing R' 801 is processing used in the present embodiment and designed such that the result is the same as that of the round processing R 201.

FIG. 9A is a diagram illustrating an overview of the round processing R' 801. The round processing R' 801 is designed such that the processing result is the same as that of the round processing R 201. In the round processing R' 801, processing of six steps (performed by a θ1 processing unit 802, a θ2 processing unit 803, a ρ processing unit 804, a π processing unit 805, a χ processing unit 806, and an ι processing unit 807) is performed on the input data piece to generate an output data piece.

Here, the ρ processing unit 804, the π processing unit 805, the χ processing unit 806, and the ι processing unit 807 are respectively similar to the ρ processing unit 302, the π processing unit 303, the χ processing unit 304, and the ι processing unit 305 in the round processing R 201. The θ1 processing unit 802 and the θ2 processing unit 803 are obtained by dividing the θ processing unit 301 in the round processing R 201.

Because the ρ processing, the χ processing, and the ι processing in the round processing R' 801 are similar to those in the round processing R 201, the description thereof is not provided.

The π processing unit 805 is similar to the π processing unit 303 in the round processing R 201. However, the π processing unit 805 does not perform the processing after holding a state data piece, but outputs a sheet data piece from a plane data piece having been input. The detail will be described below.

The θ1 processing, and the θ2 processing will be described below.

FIG. 11 is a diagram illustrating processing in the step θ1. The step θ1 corresponds to the first half operation of the step θ. In the step, column sum calculation processing is performed. More specifically, the processing is for calculating, for each column, the sum (to be referred to as a θ intermediate value) of two values: "the sum of bits in a column at a position of −1 in the x axis direction" and "the sum of bits in a column at a position of +1 in the x axis direction and −1 in the z axis direction". After receiving five sheet data pieces, the θ1 processing unit 802 outputs a θ intermediate value of one bit for each column that totals up to θ intermediate values of five times sixty-four bits. A structure for all of the θ intermediate values will be expressed as a planar structure that is parallel to the x-z plane and that has a width of five bits, a height of one bit, and a depth of sixty-four bits.

FIG. 12 is a diagram illustrating the processing in the step θ2. The step θ2 corresponds to the second half operation of the step θ, and is a step of performing column sum addition processing. That is, in the step θ2, the θ2 processing unit 803 adds the θ intermediate values calculated in the step θ1 to respective bits.

From the processing contents of the above respective steps (step θ1 and step θ2), it can be understood that there are following limitations regarding start of the processing of the respective steps.

The step θ1 is calculation of the sum, and thus, the θ1 processing unit 802 updates a θ intermediate value in the process of calculation every time when each sheet in the state is input. Therefore, when one sheet data piece of calculation results of the preceding stage is output, the θ1 processing unit 802 can start the processing in the step θ1.

In the step θ2, the θ2 processing unit 803 adds a θ intermediate value calculated in the step θ1 in calculation of each plane in the state. Since the step θ1 has been completed at the time of starting the step θ2, the θ2 processing unit 803 can start to output the processing result of the step θ2 when one plane data piece is output from the preceding stage (register).

The step ρ is calculation for each of lanes independent of each other. Therefore, when the θ2 processing unit 803 outputs one plane data piece of calculation results of the preceding stage (step θ2), the ρ processing unit 804 can start the processing in the step ρ.

In the step π, the π processing unit 805 rearranges respective lanes in a state. However, from input of one plane, output of one sheet can be obtained. Therefore, when the ρ processing unit 804 outputs one plane data piece of the calculation results of the preceding stage (step ρ), the π processing unit 805 can start the processing in the step H.

In the step χ, in calculation of each lane in a state, the χ processing unit 806 uses a lane at +1 in the x axis direction and a lane at +2 in the x axis direction.

Therefore, the x processing unit 806 can start the processing in the step χ after receiving three sheet data pieces.

The step ι is calculation for each of lanes independent of each other. Therefore, when the χ processing unit 806 outputs one sheet data piece of calculation results of the preceding stage (step χ), the ι processing unit 807 can start the processing in the step ι.

Since the π processing unit 805 receives input of a plane data piece and outputs a sheet data piece in the step π, the need of holding a state data piece can be eliminated and throughput can be improved.

In addition, since the processing is performed in units of planes in the steps θ2, ρ and π, and in units of sheets in the steps χ and ι, throughput can be improved.

There will be described below a configuration in which the π processing unit 805 receives input of plane data pieces and outputs sheet data pieces, and the round processing is performed in units of planes in the steps θ2, ρ, and π, and performed in units of sheets in the steps χ and ι.

FIG. 16 is a diagram illustrating a schematic configuration of an implementation example of the KECCAK algorithm according to the first exemplary embodiment. In this example, a lane structure out of an input data piece 1901 is input as a unit. However, the order of input data pieces is previously determined to be in sequential in the y direction: (x, y)=(0, 0), (0, 1), (0, 2), . . . . A register 1908 holds four lane structure data pieces that are the input data pieces 1901 and outputs a sheet structure data piece as a unit when the register 1908 receives the fifth lane structure data piece. Note that, the register 1908 may be configured to output the first sheet structure data piece when the register 1908 holds data enabling generation of at least the first sheet structure data piece. An output data piece 1907 is output in units of sheet structure data pieces when calculation is completed.

An exclusive OR (XOR) operator 1902 calculates exclusive OR of a message block and internal data each time of performing the round processing twenty-four times. A register 1903 holds the whole of the internal data. The register 1903 holds input data pieces of the sheet structure that are input and outputs output data pieces of the plane structure. A circuit 1904 is for the processing in the steps θ2, ρ, and π. Data input to the circuit 1904 is data of the plane structure, and data output from the circuit 1904 is data of the sheet structure. The detail will be described below. A circuit 1905 is provided for the processing in the steps χ and ι. A circuit 1906 is provided for processing in the step θ1.

FIG. 17 is a diagram illustrating the configuration of FIG. 16 in more detail. An input data piece 2001 is the same as the input data piece 1901 in FIG. 16. A register 2009 holds at least the first sheet structure data piece out of the input data piece 2001 and outputs a sheet structure data piece as a unit. The register 2009 is the same as the register 1908 in FIG. 16. The register 2009 outputs one sheet structure data piece as a unit at every clock, and outputs sheet structure data pieces in ascending order of the x coordinate. A multiplexer 2002 outputs an input data piece as is when the multiplexer 2002 calculates exclusive OR of the input data piece and the internal state and outputs zero in other cases.

A register 2004 holds the whole of the internal data similarly to the register 1903 illustrated in FIG. 16. A circuit 2005 calculates in the steps θ2, ρ, and π (hereinafter, referred to as a θ2 & ρ & π circuit 2005). As described above, to the θ2 & ρ & π circuit 2005, plane structure data pieces are input in ascending order of the y coordinate (in the order of y=0, 1, 2, 3, and 4), and the θ2 & ρ & π circuit 2005 outputs sheet structure data pieces in ascending order of the x coordinate (in the order of x=0, 1, 2, 3, and 4).

A circuit 2006 is for the processing in the steps χ and ι (hereinafter, referred to as a χ & ι circuit 2006) and outputs one sheet structure data piece of the calculation results as a unit. A multiplexer 2007 outputs zero for initialization upon start of hash value calculation and outputs data in the process of calculation in other cases.

A circuit 2008 is for the processing in the step θ1 (hereinafter, referred to as a θ1 circuit 2008) and outputs an intermediate value (θ intermediate value) of five times sixty-four bits when the circuit 2008 receives input of five sheet data pieces.

FIG. 18 is a diagram illustrating an implementation example of the register 2004. A combination circuit 2102 divides one sheet data piece that is an input data piece 2101 into five lane data pieces and outputs the five lane data pieces. A multiplexer 2103 alternately switches the shift direction to the vertical direction and the horizontal direction for even times of the round and odd times of the round (in FIG. 18, all symbols of the same shape as the multiplexer 2103 perform similarly thereto). A register 2104 is of a mesh configuration of five times five stages for storing information of one lane in one stage. The register 2104 receives input of five lane data pieces and outputs five lane data pieces (data of one sheet or one plane) at every clock. A combination circuit 2105 outputs data of five lanes (five lanes including R0, R1, R2, R3, and R4 or five lanes including R0, R5, R10, R15, and R20) having been output from the last stage of the register 2104 is output as one plane data piece. An output data piece 2106 is illustrated.

FIGS. 23A and 23B are diagrams illustrating characteristics of the processing in the step π.

FIG. 23A illustrates an example of data before the processing in the step π is performed. For ease of understanding of positions to which the respective lanes are rearranged by the π processing, sequential numbers are allocated to the respective lanes. FIG. 23B illustrates an example of data after the processing in the step π is performed. In this diagram, it can be seen that the bits of one plane data piece at y=0 (a data piece 231 in FIG. 23A) are all rearranged to positions in one sheet data piece at x=0 (a data piece 232 in FIG. 23B). The data pieces at y=1, 2, 3, and 4 are rearranged similarly. That is, when the processing in the step π is performed, each plane data piece at y=i (i=0, 1, 2, 3, and 4) is output as one sheet data piece at x=i.

By utilizing the characteristics of the processing in the step π as described above, the need of holding all data pieces (i.e., five plane structure data pieces) in a register for the processing in the step π is eliminated, and thus from input of one plane, one sheet output can be obtained.

FIGS. 24A, 24B, 24C, 24D, and 24E are diagrams illustrating sheet-plane unit conversion performed by the register 2004. An input data piece for the register 2004 is one sheet data piece for one clock as described above. FIGS. 24A, 24B, and 24C are explanation diagrams of the register 2004 when a sheet data piece is input at the first clock, when the sheet data piece is input at the second clock, and when the sheet data piece is input at the fifth clock respectively. As illustrated in FIGS. 24A, 24B, and 24C, the register 2004 receives input of five sheet data pieces (one state data piece) over five clocks in the y direction (x direction). FIG. 24D is an explanation diagram of the register 2004 when the register 2004 outputs the first plane data piece after receiving input of five sheet data pieces. FIG. 24E is an explanation diagram of the register 2004 when the register 2004 outputs the second plane data piece. The register 2004 outputs each of five lane data pieces at every clock in the x direction (y direction) after receiving input of five sheet data pieces to provide one plane data piece. The register 2004 performs sheet-plane conversion in the above flow.

Note that, data is input to the register 2004 while switching the input direction between the x axis direction and the y axis direction alternately. For example, five plane data pieces are input in the y axis direction, and then five sheet data pieces are input in the x axis direction.

FIG. 19 is a diagram illustrating an implementation example of the θ2 & ρ & π circuit 2005. The θ2 & ρ & π circuit 2005 calculates output data pieces using θ intermediate values that the circuit 2008 has previously calculated for a target plane. Since the processing includes the processing in the step π, output data pieces has the sheet structure.

As described above, the θ2 & ρ & π circuit 2005 receives input of one plane data piece at every clock as an input data piece 2201. An input data piece 2202 is input from the θ1 circuit 2008 and corresponds to a θ intermediate value.

The processing of an exclusive OR (XOR) operator 2203 corresponds to the operation of the step θ2 as described above. A logic circuit (ρ circuit) 2204 performs the operation of the step ρ. A logic circuit (π circuit) 2205 performs the operation of the step π and can output one sheet from input of one plane. An output data piece 2206 is one sheet data piece that is output at every clock.

FIG. 25 is a diagram illustrating an implementation example of the π circuit 2205. As described above, the π circuit 2205 receives input of one plane data piece at every clock as an input data piece 2601. A combination circuit 2602 divides one plane data piece that is the input data piece 2601 into five lane data pieces and outputs the five lane data pieces.

A combination circuit 2603 rearranges in the step π. The combination circuit 2603 rearranges five lane data pieces aligned in the x axis direction to five lane data pieces aligned in the y axis direction according to the table of FIG. 5B and outputs the five lane data pieces.

A combination circuit 2604 outputs five lane data pieces as one sheet data piece. An output data piece 2605 is one sheet data piece at every clock.

FIG. 20 is a diagram illustrating an implementation example of the χ & ι circuit 2006. The χ & ι circuit 2006 calculates an output data piece by using a target sheet data piece and two sheet data pieces at positions of +1 and +2 in the x axis direction from the target sheet data piece.

As described above, the χ & ι circuit 2006 receives input of one sheet data piece at every clock as an input data piece 2301. A multiplexer 2302 outputs the input data piece 2301 as is during the first five clocks from the start of the processing and outputs data from a register 2304 during the following two clocks.

A register 2303 having a two-stage configuration stores information of one sheet in one stage. The register 2304 having a two-stage configuration stores information of one sheet in one stage. The register 2304 stores information of sheets at x=0 and x=1.

A combination circuit 2305 is a logic circuit configured to perform the operations of the above steps χ and ι. An output data piece 2306 of one sheet is output as a unit.

As described above, the θ2 & ρ & π circuit 2005 is for the processing in units of planes, and the χ & ι circuit 2006 is for the processing in units of sheets. Thus, on the path from the output of the θ2 & ρ & π circuit 2005 to the input of the χ & ι circuit 2006, only a combination circuit is connected.

More specifically, a latch circuit is not included on the path. Therefore, a data piece can pass through the path within one clock.

As described above, according to the first exemplary embodiment, the π processing unit 805 receives input of a plane and outputs a sheet, and processing in a round is performed using a plane and a sheet as units. Thus, the processing in the round can be pipelined.

In addition, as described above, according to the first exemplary embodiment, a unit of input processing at the start of a round is the plane, and a unit of output processing at the end of a round is the sheet. However, since plane-sheet unit conversion is performed from the input to the output of the register 2004, the unit of input processing can be units of planes at the start of a next round.

Note that, an input unit to the θ1 circuit 2008 is the sheet structure in the first exemplary embodiment, but the input unit may be the plane structure. In that case, after receiving five plane data pieces, the θ1 circuit 2008 outputs θ intermediate values of five times sixty-four bits. However, when the input unit to the θ1 circuit 2008 is the sheet structure, the θ1 circuit 2008 can sequentially calculate a θ intermediate value at every input, which is an advantageous effect.

FIG. 14A is an operation timing chart of the respective modules of the implementation example according to the first exemplary embodiment. The θ2 & ρ & π circuit 2005 and the χ & ι circuit 2006 are configured for pipeline processing. Since the θ1 circuit 2008 can calculate a θ intermediate value from input of five sheet data pieces, it takes five clocks. Two clocks after the θ2 & ρ & π circuit 2005 outputs one sheet data piece, the χ & ι circuit 2006 can output one sheet data piece. That is, the χ & ι circuit 2006 can start the processing upon receiving three sheet data pieces. Thus, the θ2 & ρ & π circuit 2005 and the χ & ι circuit 2006 can operate in parallel. In addition, it takes seven clocks for one-time round processing.

Hereinafter, an implementation example in which processing is performed on a lane data piece as a unit by the algorithm according to specifications will be described for comparison with the implementation example of the above first exemplary embodiment.

FIG. 15 is a diagram illustrating a schematic configuration of the implementation example when processing is performed on a lane as a unit by the KECCAK algorithm according to specifications. The processing of the five steps (θ, ρ, π, χ, and ι) is similar to that described above, and thus the description thereof is not provided.

The KECCAK-f receives one lane data piece (data having a length of sixty-four bits) from an input data piece 1801 at every clock. The KECCAK-f receives lane data pieces in one state data piece in the order illustrated in FIG. 2F.

An Exclusive OR processing unit 1802 is an operator that calculates exclusive OR of a message block and an internal data piece every time when the round processing is performed twenty-four times.

A register 1803 holds the whole of the internal data expressed as a state data piece. A processing block (π circuit) 1804 performs the step π. However, as described above, the processing in the step π can be performed only after the processing in the step ρ is completed. A processing block (θ circuit) 1805 performs the step θ, and a processing block (ρ circuit) 1806 performs the step ρ.

A processing block (χ circuit) 1807 performs the step χ, and a processing block (ι circuit) 1808 performs the step ι. A multiplexer 1809 outputs data having been input from the processing block 1806 in the first half of round processing and outputs data from the processing block 1808 in the second half thereof. The KECCAK-f outputs an output data piece 1810 of one lane when calculation is completed.

FIG. 14B is an operation timing chart of the respective modules when processing is performed on a lane as a unit by the algorithm according to specifications. A pair of the θ circuit 1805 and the ρ circuit 1806 and a pair of the χ circuit 1807 and the ι circuit 1808 operate in different time-periods and do not operate at the same time. It takes fifty-one clocks for one-time round processing.

As can be seen from comparison of FIG. 14A and FIG. 14C, throughput of the processing can be improved by using the configuration of the implementation example according to the first exemplary embodiment.

More specifically, the followings can be said.

The two processing circuits: the θ2 & ρ & π circuit 2005 and the χ & ι circuit 2006 operate in parallel, and thus utilization efficiency of the circuits can be improved.

One-time round processing can be performed within a smaller number of clocks (less time).

As a hash value generating device according to a second exemplary embodiment of the present invention, a device configured to generate a hash value of SHA-3 (KECCAK algorithm) will be hereinafter described as an example. In the description below, a specific data length or a specific bit value may be provided, but the present invention is not limited to the specific values. The KECCAK algorithm and the data structures are similar to those of the first exemplary embodiment, and thus, points different from the first exemplary embodiment will be described.

Round processing R' 901 will be described. The round processing R' 901 is processing used in the present embodiment and designed such that the result is the same as that of the round processing R 201. However, processing contents of the round processing R' 901 are different from the specifications of the KECCAK algorithm.

FIG. 9B is a diagram illustrating an overview of the round processing R' 901. The round processing R' 901 is designed such that the processing result is the same as that of the round processing R 201. In the round processing R' 901, processing of six steps is performed (by a θ1 processing unit 902, a π processing unit 903, a θ2' processing unit 904, a ρ' processing unit 905, a χ processing unit 906, and an ι processing unit 907) on an input data piece to generate an output data piece.

Note that, the π processing unit 903, the χ processing unit 906, and the ι processing unit 907 performs processing similar to those performed by the π processing unit 303, the χ processing unit 304, and the ι processing unit 305 of the round processing R 201. The ρ' processing unit 905 performs processing of shifting values of respective bits in the z axis direction similarly to the ρ processing unit 302 of the round processing R 201, but the number of bits by which the values are shifted is different. The θ1 processing unit 902 and the θ2' processing unit 904 are obtained by dividing the θ processing unit 301 in the round processing R 201.

Since the χ processing and the ι processing in the round processing R' 901 are similar to those in the round processing R 201, the description thereof is not provided.

The π processing unit 903 is similar to the π processing unit 303 in the round processing R 201. However, the π processing unit 903 does not perform the processing after a state data piece is held, but receives a plane data piece and then outputs a sheet data piece. The detail is similar to the first exemplary embodiment.

The θ1 processing of the round processing R' 901 is similar to the θ1 processing of the round processing R' 801, and thus the description thereof is not provided. The ρ' processing and the θ2' processing will be described below.

FIG. 10A is a diagram illustrating processing in the step ρ' (ρ' processing unit 905). In the step ρ', the ρ' processing unit 905 performs processing of cyclically shifting a value of each bit in the z axis direction similarly to the step ρ. However, the number of bits by which the values are cyclically shifted in each lane is different from that of the step ρ, and is illustrated in FIG. 10B. Note that, in order to perform the ρ' processing, a holding section previously holds a table listing shifting amounts as illustrated in FIG. 10C and the ρ' processing unit 905 performs the ρ' processing using the table being held. This table is determined in consideration of the π processing. The detail will be described below.

In order to describe that the processing result of the round processing R' 901 and that of the round processing R 201 are the same, first, there will be described that the processing result of the round processing R 201 and the processing result of round processing R" 911 are the same.

FIG. 9C is a diagram of the round processing R" 911. In the round processing R" 911, processing of five steps is performed (by a θ processing unit 912, a π processing unit 913, a ρ' processing unit 915, a χ processing unit 916, and an ι processing unit 917) on the input data piece to generate an output data piece. Here, the θ processing unit 912, the π processing unit 913, the χ processing unit 916, and the ι processing unit 917 are respectively similar to the θ processing unit 301, the π processing unit 303, the χ processing unit 304, and the ι processing unit 305 of the round processing R 201. The ρ' processing unit 915 is similar to the ρ' processing unit 905 of the round processing R' 901.

When the round processing R 201 is compared with the round processing R" 911, they are different in a point that the π processing unit 913 and the ρ' processing unit 915 perform the processing in this order in the round processing R" 911 while the ρ processing unit 302 and the π processing unit 303 perform the processing in this order in the round processing R 201.

Here, in the step ρ of the round processing R 201, the ρ processing unit 302 shifts values in the z axis direction according to rules determined for respective lanes, and the π processing unit 303 rearranges the respective lanes. On the other hand, in the round processing R" 911, the π processing unit 913 rearranges the respective lanes (processing in the step π), and thereafter the ρ' processing unit 915 shifts values in the z axis direction according to rules determined for the respective lanes in consideration of the rearrangement processing (processing in the step ρ'). More specifically, in the round processing R" 911, the step π is performed before the step ρ', but the shifting amount by which values are shifted in the z axis direction by the ρ' processing unit 915 is changed in consideration of the processing in the step π, whereby the processing result of the round processing R" 911 becomes the same as that of the round processing R 201.

FIG. 10C is a table listing shifting amounts for respective lanes used in the step ρ'.

A method of generating the table illustrated in FIG. 10C will be specifically described. First, the round processing R 201 will be considered. In the round processing R 201, the ρ processing unit 302 and the π processing unit 303 perform the processing in this order. The numbers in FIG. 4B are shifting amounts in the step ρ. For example, the shifting amount for a lane at the position of x=0 and y=4 is eighteen bits. Next, the lane rearrangement by the π processing is confirmed using FIGS. 5A and 5B. It can be seen that the π processing unit 303 moves the lane at the position of x=0 and y=4 to the position of x=4, y=2.

Next, the round processing R" 911 will be considered. In the round processing R" 911, the π processing unit 913 and the ρ' processing unit 915 perform the processing in this order. Since the π processing is performed before the ρ' processing, a lane for which the ρ' processing unit 915 should shift values by eighteen bits is a lane at the position of x=4, y=2. Therefore, the number at the position of x=4, y=2 in FIG. 10B is eighteen. Shifting amounts of the other lanes can be similarly obtained to be the other numbers in FIG. 10B.

That is, the table listing the shifting amounts for the respective lanes used in the step ρ' illustrated in FIG. 10C is a table determined in consideration of the rearrangement processing of the π processing.

Next, there will be described that the processing result of the round processing R" 911 is the same as that of the round processing R' 901.

Note that, the π processing unit 903, the ρ' processing unit 905, the χ processing unit 906, and the ι processing unit 907 respectively perform the processing similarly to the π processing unit 913, the ρ' processing unit 915, the χ processing unit 916, and the ι processing unit 917 of the round processing R" 911. The θ1 processing unit 902 and the θ2' processing unit 904 are obtained by dividing the θ processing unit 912.

When the round processing R" 911 is compared with the round processing R' 901, they are different in a point that the θ processing unit 912 and the π processing unit 913 perform the processing in this order in the round processing R" 911 while the θ1 processing unit 902, the π processing unit 903, and the θ2' processing unit 904 perform the processing in this order in the round processing R' 901.

Here, in the round processing R" 911, the step θ is a step of adding the sum of two columns to each bit, the two columns being adjacent to the bit, and the step π is a step of rearranging the respective lanes. On the other hand, in the round processing R' 901, the θ1 processing unit 902 calculates the sum of two columns that are adjacent to each bit (processing in the step θ1). Then, the π processing unit 913 rearranges the respective lanes (processing in the step π), and the θ2' processing unit 904 adds the sum of the columns to a bit in consideration of the rearrangement of the respective lanes (processing in the step θ2').

FIG. 13A is a diagram illustrating processing in the step θ2'. The step θ2' corresponds to the operation of the second half of the step θ and is a step of performing column sum addition processing. That is, the step θ2' is a step of adding θ intermediate values calculated in the step θ1 to the respective bits.

However, it should be noted that the step π has been already performed before the step θ2'. More specifically, in the step θ of the round processing R" 911 (i.e., the step θ of the round processing R 201), an x coordinate of each bit and an x coordinate of a θ intermediate value used for calculation of the bit is the same. However, in the step θ2' of the round processing R' 901, an x coordinate of each bit and an x coordinate of a θ intermediate value used for calculation of the bit is different and the x coordinate is determined in consideration of the rearrangement of the respective lanes in the step π. The x coordinates of θ intermediate values used for calculation of respective bits are illustrated in FIG. 13B. Note that, a holding section previously holds a table in FIG. 13C providing x coordinates of θ intermediate values used for calculation of respective bits in the θ2' processing, and the θ2' processing unit 904 performs the θ2' processing using the table being held.

A method of generating the table illustrated in FIG. 13C will be specifically described. First, the round processing R" 911 will be considered. The x coordinates of θ intermediate values needed to calculate respective bits in the step θ are the same as the x coordinates of the respective bits. For example, a bit at the position of x=0, y=4 is calculated using a θ intermediate value at the position of x=0 in the step θ. Next, the lane rearrangement in the step π is confirmed using FIGS. 5A and 5B. It can be seen that the π processing unit 913 moves the bit at the position of x=0, y=4 to the position of x=4, y=2.

Next, the round processing R' 901 will be considered. Since the π processing unit 903 has already performed the step π when the θ2' processing unit 904 performs the step θ2', it can be seen that an x coordinate of a θ intermediate value needed for calculation of a bit at the position of x=4, y=2 in the step θ2' is x=0. Therefore, a number at the position of x=4, y=2 out of the numbers provided in FIG. 13B becomes zero. The x coordinates of θ intermediate values for other bits can be similarly obtained to be the other numbers in FIG. 13B.

That is, the table in FIG. 13C providing the x coordinates of θ intermediate values when the θ2' processing unit 904 performs the step θ2' is a table determined in consideration of the rearrangement processing of the π processing.

As described above, the processing result of the round processing R 201 and that of the round processing R" 911 are the same. In addition, the processing result of the round processing R" 911 and the processing result of the round processing R' 901 are the same. Therefore, the processing result of the round processing R' 901 and the processing result of the round processing R 201 are the same.

From the processing contents of the above respective steps (steps θ1, θ2', and ρ'), it can be understood that there are following limitations regarding start of the processing of the respective steps.

In the step θ1, the θ1 processing unit 902 calculates the sum, and thus, the θ1 processing unit 902 updates a θ intermediate value in the process of calculation every time when each plane in the state is input. Therefore, when one plane data piece of calculation results of the preceding stage is output, the θ1 processing unit 902 can start the processing in the step θ1.

In the step θ2', the θ2' processing unit 904 adds a θ intermediate value calculated in the step θ1 in calculation of each plane in the state. Since the step θ1 has been completed at the time of starting the step θ2', the θ2' processing unit 904 can start to output the processing result of the step θ2' when one plane data piece of calculation results of the preceding stage (step π) is output.

The step ρ' is calculation for each of lanes independent of each other. Therefore, when the θ2' processing unit 904 outputs one plane data piece of calculation results of the preceding stage (step θ2'), the ρ' processing unit 905 can start the processing in the step ρ'.

That is, in the steps θ1, θ2', and ρ', processing can be started when one plane data piece out of calculation results of a step of the preceding stage is output.

In addition, the processing contents of the steps π, χ, and ι of the second exemplary embodiment are the same as those described in the first exemplary embodiment. Thus, it can be understood that there are following limitations regarding start of the processing of the respective steps.

In the step π, respective lanes in a state are rearranged. However, the π processing unit 903 can output one sheet data piece from input of one plane data piece. Therefore, when the preceding stage (step θ1) outputs one plane of calculation results, the π processing unit 903 can start the processing in the step π.

In the step χ, in calculation of each lane in a state, the x processing unit 906 uses a lane at +1 and a lane at +2 in the x axis direction. Therefore, when the ρ' processing unit 905 outputs one plane data piece of calculation results of the preceding stage (step ρ'), the χ processing unit 906 can start the processing in the step χ.

The step ι is calculation for each of lanes independent of each other. Therefore, when one plane data piece of calculation results of the preceding stage (step χ) is output, the ι processing unit 907 can start the processing in the step ι.

Since a plane data piece is input and a sheet data piece is output in the step π, the need of holding a state data piece can be eliminated and throughput can be improved.

In addition, the π processing unit 903 performs processing in units of planes, and the round processing R' 901 is used instead of the round processing R 201. Therefore, throughput can be improved. Hereinafter, a configuration in which plane data pieces are input to the step π and sheet data pieces are output therefrom, and the round processing is performed in units of planes will be described.

FIG. 21 is a diagram illustrating a configuration of an implementation example of the KECCAK algorithm according to the second exemplary embodiment. Here, the order of input data pieces 2401 is previously determined to be sequential in the x direction: (x, y)=(0, 0), (1, 0), (2, 0), . . . . A register 2409 holds four lane structure data pieces that are the input data pieces 2401 and outputs a plane structure data piece as a unit when the register 2409 receives the fifth lane structure data piece. Note that, the register 2409 may be configured to output the first plane structure data piece when the register 2409 holds data enabling generation of at least the first plane structure data piece. When calculation is completed, an output data piece 2410 is output in units of the sheet structures.

A multiplexer 2402 outputs an input data piece as is when the multiplexer 2402 calculates exclusive OR of the input data piece and the internal state and outputs zero in other cases.

A circuit 2404 calculates in the step π (hereinafter, referred to as a π circuit 2404). The π circuit 2404 receives input of a plane structure data piece and outputs a sheet structure data piece similarly to the π circuit 2205 illustrated in FIG. 19. More specifically, plane structure data pieces are input in ascending order of the y coordinate (in the order of y=0, 1, 2, 3, and 4), and outputs sheet structure data pieces in ascending order of the x coordinate (in the order of x=0, 1, 2, 3, and 4).

A register 2405 holds the whole of the internal data. Since the register 2405 is similar to the register 2004 of the first exemplary embodiment, the description thereof is not provided.

A circuit 2406 performs calculation in the steps θ2', ρ', χ, and ι (hereinafter, referred to as a θ2' & ρ' & χ & ι circuit 2406) and outputs one plane structure data piece of the calculation results as a unit. A multiplexer 2407 outputs zero upon start of calculation of a hash value for initialization and outputs data in the process of calculation in other cases.

A circuit 2408 is for the processing in the step θ1 (hereinafter, referred to as a θ1 circuit 2408) and outputs an intermediate value (θ intermediate value) of five times sixty-four bits when the circuit 2408 receives five plane data pieces.

FIG. 22 is a diagram illustrating an implementation example of the θ2' & ρ' & χ & ι circuit 2406. The θ2' & ρ' & χ & ι circuit 2406 calculates output data pieces using θ intermediate values that the circuit 2408 has previously calculated for a target plane.

The θ2' & ρ' & χ & ι circuit 2406 receives input of one plane data piece at every clock as an input data piece 2501. An input data piece 2502 is input from the θ1 circuit 2408, and corresponds to θ intermediate values.

The processing by an exclusive OR (XOR) operator 2503 corresponds to the operation of the step θ2' described above. A combination circuit 2504 is a logic circuit configured to actually perform the operations of the above steps ρ', χ, and ι and to outputs one plane data piece at every clock. An output data piece 2505 is one plane data piece that is output at every clock.

As described above, the π circuit 2404 performs processing in units of planes and outputs a sheet structure data piece, the register 2405 converts the sheet structure data piece to a plane structure, and the θ2' & ρ' & χ & ι circuit 2406 performs processing in units of planes. On the path from the output of the θ2' & ρ' & χ & ι circuit 2406 and to the input of the π circuit 2404, only a combination circuit is connected. More specifically, a latch circuit is not included on the path. Therefore, a data piece can pass through the path within one clock.

Note that, an input unit to the θ1 circuit 2408 is the plane structure in the second exemplary embodiment, but the input unit may be the sheet structure. In that case, after receiving input of five sheet data pieces, the θ1 circuit 2408 outputs θ intermediate values of five times sixty-four bits.

FIG. 14B is an operation timing chart of the respective modules of the implementation example according to the second exemplary embodiment. The output from the θ2' & ρ' & χ & ι circuit 2406 to the π circuit 2404 is configured for pipeline processing. The processing of each of the all steps in the round processing can be started when one plane data piece is input. That is, all steps in the round processing can be performed in parallel. In addition, it takes five clocks for one-time round processing.

Hereinafter, an implementation example in which processing is performed on a lane data piece as a unit by the algorithm according to specifications will be described for comparison with the implementation example of the above second exemplary embodiment. The implementation example in which processing is performed on a lane data piece as a unit by the algorithm according to the specifications is similar to the contents described in the first exemplary embodiment, and thus the description thereof is not provided.

FIG. 14C is an operation timing chart of the respective modules of the implementation example in which processing is performed on a lane data piece as a unit according to specifications.

As can be seen from comparison of FIG. 14B and FIG. 14C, throughput of the processing can be improved by using the configuration of the implementation example according to the second exemplary embodiment.

More specifically, the followings can be said.

The two processing circuits: the π circuit 2404 and the θ2' & ρ' & χ & ι circuit 2406 operate in parallel, and thus utilization efficiency of the circuits can be improved.

One-time round processing can be performed within a smaller number of clocks (less time).

As described above in the present embodiment, the conversion of processing unit during the θ1 processing can reduce time for holding data.

According to the exemplary embodiments, a technique capable of improving throughput for generating hash values can be provided.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-045574 filed Mar. 7, 2013 and No. 2014-017413 filed Jan. 31, 2014, which are hereby incorporated by reference herein in their entirety.

The invention claimed is:

1. A hash value generating device comprising:
a θ processor that operates to perform θ processing included in round processing of Secure Hash Algorithm 3 (SHA-3 algorithm);
a ρ processor that operates to perform ρ processing included in the round processing;
a π processor that operates to perform π processing included in the round processing;
a χ processor that operates to perform χ processing included in the round processing; and
an ι processor that operates to perform ι processing included in the round processing,
wherein the π processor receives input of data in units of planes, performs the π processing and outputs data in units of sheets,
wherein each of the θ processor, the ρ processor, the π processor, the χ processor, and the ι processor is arranged independently in the hash value generating device, and the hash value generating device further comprises a register that operates to hold data on which processing has been performed, and
wherein the register receives input of data in units of sheets and outputs data in units of planes.

2. The hash value generating device according to claim 1, wherein the register outputs one plane after having held five sheets.

3. The hash value generating device according to claim 2, wherein the θ processor includes a θ1 processor that operates to perform column sum calculation processing and a θ2 processor that operates to perform column sum addition processing.

4. The hash value generating device according to claim 3, wherein the θ1 processor performs the θ1 processing during a period in which five sheets are input to the register.

5. The hash value generating device according to claim 1, wherein the register holds data processed by the π processor.

6. The hash value generating device according to claim 3, wherein in the round processing, the π processor performs processing before the θ2 processor and the ρ processor perform processing.

7. The hash value generating device according to claim 6, wherein the θ2 processor, the ρ processor, the χ processor, and the ι processor perform processing in units of planes.

8. The hash value generating device according to claim 1, wherein the register holds data processed by the ι processor.

9. The hash value generating device according to claim 3, wherein the θ2 processor and the ρ processor perform processing in units of planes, and
wherein the χ processor and the ι processor perform processing in units of sheets.

10. The hash value generating device according to claim 1, wherein the hash value generating device outputs a hash value obtained by performing the round processing using the θ processor, the ρ processor, the π processor, the χ processor, and the ι processor.

11. The hash value generating device according to claim 1, wherein the plane is data of a structure having m bits in an x axis direction, one bit in a y axis direction, and s bits in a z axis direction, and the sheet is data of a structure having one bit in the x axis direction, n bits in the y axis direction, and s bits in the z axis direction.

12. The hash value generating device according to claim 1, wherein the θ processor calculates a sum of bits along an x axis direction and adds the calculated sum to a predetermined bit,
wherein the ρ processor shifts values of respective bits in a z axis direction,
wherein the π processor rearranges values of respective bits in an x-y plane,
wherein the χ processor converts a bit using bits in a line in the x axis direction, and
wherein the ι processor adds predetermined values to respective bits.

13. A hash value generating device that performs round processing of hash algorithm in which a data piece of a structure having m bits in an x axis direction, n bits in a y axis direction, and s bits in a z axis direction is processed, the hash value generating device comprising:
a first processor that operates to calculate a sum of bits in the x axis direction and add the calculated sum to a predetermined bit;
a second processor that operates to shift a bit in the z axis direction;
a third processor that operates to rearrange respective bits in an x-y plane;
a fourth processor that operates to convert a bit using bits in a line in the x axis direction; and
a fifth processor that operates to add predetermined values to respective bits,
wherein the third processor receives input of data in units of structures each having m bits in the x axis direction, one bit in the y axis direction, and s bits in the z axis direction, rearranges respective bits in an x-y plane, and outputs data in units of structures each having one bit in the x axis direction, n bits in the y axis direction, and s bits in the z axis direction,
wherein each of the first processor, the second processor, the third processor, the fourth processor, and the fifth processor is arranged independently in the hash value generating device, and the hash value generating device further comprises a register that operates to hold data on which processing has been performed, and
wherein the register receives input of data in units of sheets and outputs data in units of planes.

14. The hash value generating device according to claim 13,
wherein the register receives input of data in units of structures each having one bit in the x axis direction, n bits in the y axis direction, and s bits in the z axis direction and outputs data in units of structures having m bits in the x axis direction, one bit in the y axis direction, and s bits in the z axis direction.

15. The hash value generating device according to claim 14, wherein the register outputs one unit of data of the structure having m bits in the x axis direction, one bit in the y axis direction, and s bits in the z axis direction after holding five units of data of the structure having one bit in the x axis direction, n bits in the y axis direction, and s bits in the z axis direction.

16. The hash value generating device according to claim 15, wherein the first processor includes a sixth processor operating to calculate the sum of bits in the x axis direction and a seventh processor operating to add the calculated sum to the predetermined bit.

17. The hash value generating device according to claim 16, wherein the sixth processor performs processing during a period in which the register receives five units of data of the structure having one bit in the x axis direction, n bits in the y axis direction, and s bits in the z axis direction.

18. The hash value generating device according to claim 13, wherein the hash value generating device outputs a hash value obtained by performing the round processing using the first processor, the second processor, the third processor, the fourth processor, and the fifth processor.

* * * * *